US012773777B2

(12) United States Patent
Li

(10) Patent No.: US 12,773,777 B2
(45) Date of Patent: Oct. 27, 2026

(54) DEVICE FOR GENERATING LEARNING DATA, METHOD FOR GENERATING LEARNING DATA, AND MACHINE LEARNING DEVICE AND MACHINE LEARNING METHOD USING LEARNING DATA

(71) Applicant: FANUC CORPORATION, Yamanashi (JP)

(72) Inventor: Weijia Li, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 97 days.

(21) Appl. No.: 18/700,704

(22) PCT Filed: Oct. 25, 2021

(86) PCT No.: PCT/JP2021/039354
§ 371 (c)(1),
(2) Date: Apr. 12, 2024

(87) PCT Pub. No.: WO2023/073780
PCT Pub. Date: May 4, 2023

(65) Prior Publication Data
US 2024/0399570 A1 Dec. 5, 2024

(51) Int. Cl.
*G06V 10/774* (2022.01)
*B25J 9/16* (2006.01)

(52) U.S. Cl.
CPC ............ *B25J 9/163* (2013.01); *G06V 10/774* (2022.01)

(58) Field of Classification Search
CPC . G06T 2207/30164; G06T 2207/20081; G06T 7/0004; G06T 2207/20084;
(Continued)

(56) References Cited

U.S. PATENT DOCUMENTS 10,596,698 B2 * 3/2020 Oota ..................... G06F 18/217
2023/0294173 A1 * 9/2023 Freytag ............. G05B 23/0243
700/118

FOREIGN PATENT DOCUMENTS

EP 3796369 A1 3/2021
JP 2018-161692 A 10/2018
(Continued)

OTHER PUBLICATIONS

CN 103567677 2014 art (Year: 2014).*

*Primary Examiner* — Mike Anderson
(74) *Attorney, Agent, or Firm* — HAUPTMAN HAM, LLP

(57) ABSTRACT

This device for generating learning data is provided with a measuring device, such as a visual sensor, that measures an arrangement region of a plurality of workpieces and acquires an image. The device for generating learning data is provided with a learning data generation unit that generates learning data including an image acquired by the visual sensor and a workpiece removal position. The device for generating learning data generates a plurality of sets of learning data by repeating: control of the movement of the workpieces using a movement device so as to change the arrangement pattern of the workpieces; measurement of the arrangement region of the plurality of workpieces by the visual sensor; and generation of learning data by the learning data generation unit.

15 Claims, 11 Drawing Sheets

(58) Field of Classification Search
CPC .... G06T 1/0014; G06T 7/0002; B25J 9/1697; B25J 9/163; B25J 9/1664; B25J 19/04
See application file for complete search history.

(56) References Cited

FOREIGN PATENT DOCUMENTS

| | | | |
|---|---|---|---|
| JP | 2019-034836 | A | 3/2019 |
| JP | 2019-056966 | A | 4/2019 |
| JP | 2019-057250 | A | 4/2019 |
| JP | 2020-082322 | A | 6/2020 |
| JP | 2021-070122 | A | 5/2021 |
| TW | 202044093 | A | 12/2020 |

* cited by examiner

DEVICE FOR GENERATING LEARNING DATA, METHOD FOR GENERATING LEARNING DATA, AND MACHINE LEARNING DEVICE AND MACHINE LEARNING METHOD USING LEARNING DATA

RELATED APPLICATIONS

The present application is a National Phase of International Application No. PCT/JP2021/039354 filed Oct. 25, 2021.

TECHNICAL FIELD

The present invention relates to a training data generator, a method of generating training data, and a machine learning apparatus and a machine learning method using training data.

BACKGROUND ART

There is a known technique for conveying a workpiece in a robot device including an articulated robot. By changing position and orientation while holding the workpiece, the robot can convey the workpiece to a target position and orientation. Therefore, the robot device needs to change a position and orientation of the robot in response to a position and orientation of the workpiece.

It is known that in order to hold a workpiece, a robot device images, by a vision sensor, a workpiece arranged at a predetermined position, and controls a robot based on information obtained from the vision sensor. For example, it is known that a robot controller calculates the position and orientation of a workpiece from an image obtained by a vision sensor, and controls the position and orientation of a robot in response to the position and orientation of the workpiece.

In addition, in recent years, performing machine learning in order to control machines in various fields has been known (e.g., Japanese Unexamined Patent Publication No. 2019-34836A). As the machine learning, reinforcement learning, supervised learning, unsupervised learning, or the like is known.

It is known that a robot device configured to convey a workpiece performs, from an image of the workpiece imaged by a vision sensor, machine learning in order to estimate the position and orientation of the workpiece picked out by a robot. For example, machine learning using training data is performed and a trained model is generated. Then, there is a known technique for calculating the position and orientation of a workpiece picked out by a robot from an image imaged by a vision sensor using a generated trained model (e.g., Japanese Unexamined Patent Publication No. 2019-56966A and Japanese Unexamined Patent Publication No. 2018-161692A).

CITATION LIST

Patent Literature

PTL 1: Japanese Unexamined Patent Publication No. 2019-34836A

PTL 2: Japanese Unexamined Patent Publication No. 2019-56966A

PTL 3: Japanese Unexamined Patent Publication No. 2018-161692A

SUMMARY OF INVENTION

Technical Problem

In order to convey a workpiece, a robot device can image, by a vision sensor, a region in which a plurality of workpieces are arranged, and calculate a pick position of a workpiece for picking out one workpiece. In order to perform machine learning such as supervised learning, it is necessary to generate, as training data, data including an image in which a workpiece appears and a pick position of each workpiece.

In machine learning, use of a large number of training data makes it possible to generate a trained model capable of accurately estimating the pick position and orientation of a workpiece. For example, there is a work of picking out a plurality of randomly stacked workpieces. Alternatively, there is a work of picking out aligned workpieces. In either work, it is preferable to perform machine learning with a large number of training data.

However, there is a problem that generating a large number of training data takes a large amount of work and time. In particular, when the workpiece is large or heavy, great effort is needed for the worker to change an arrangement pattern of the workpiece. In other words, there is a problem that it is difficult to acquire a large amount of training data while also changing the arrangement pattern of the workpiece.

For example, there may be a case of obtaining training data by changing the appearance (arrangement pattern) of a large workpiece that is difficult for one worker to carry. Collecting training data requires a plurality of workers to move the workpiece. For this reason, efficiency of generating the training data is poor. Furthermore, when the workpiece is large, there may be a case where even a plurality of workers have difficulty in conveying the workpiece.

On the other hand, a simulation device can generate training data. For example, a simulation device can generate a virtual three-dimensional space by using a three-dimensional computer aided design (CAD) model created with three-dimensional CAD software or the like. In the virtual three-dimensional space, an arrangement pattern of a plurality of workpieces is generated by using a three-dimensional CAD model of the workpiece. The simulation device can generate an image imaged by a virtual vision sensor from a predetermined position in the virtual three-dimensional space. The image and the position of the workpiece at this time can be used as training data.

However, there is a problem that an image generated by the simulation device is different from an image acquired when actual work is performed in the real world. For example, when a work of actually picking out a workpiece is performed, a shadow of an object appearing on the workpiece or glossiness of the surface of the workpiece may change depending on a surrounding illumination state. Alternatively, halation may occur in the image. Furthermore, in the real world, there are variations in the presence or absence of a stain on the workpiece and the position and size thereof, the presence or absence of a flaw of the workpiece and the position and size thereof, or the position of an object (e.g., a label or tape) actually attached to the workpiece. The image generated by the simulation device is an ideal image on which these situations are not reflected. In addition, it becomes training data in which a size error or manufacturing variation when the workpiece is manufactured is not reflected. Furthermore, there may be a case where the workpiece is deformed when the workpiece is conveyed. When the training data is generated by the simulation device, there is a problem of not being able to generate real training data corresponding to a real state by reflecting deformation, manufacturing variation, or the like of the workpiece.

As described above, when a trained model is generated using, as training data, an ideal image different from an image acquired in actual work, there may be a case of not being able to accurately estimate the pick position and orientation of the workpiece handled in the actual work. As a result, there is a high possibility that the workpiece cannot be held in actual work. In other words, there is a problem that the success rate of the work in which the robot device conveys the workpiece decreases.

Solution to Problem

A first aspect of the present disclosure is a training data generator used for machine learning. The training data generator includes a measuring instrument configured to measure an arrangement region of a plurality of workpieces and acquire at least one image selected from a group of a two-dimensional image and a three-dimensional image. The training data generator includes a movement device configured to move at least one workpiece, and a control unit configured to control an operation of the movement device. The training data generator includes a training data generating unit configured to generate training data including an image acquired by the measuring instrument and pick position information of a workpiece for picking out a workpiece. The training data generator generates a plurality of training data by repeating control of moving a workpiece by the movement device so as to change an arrangement pattern of a workpiece, measurement of an arrangement region of a plurality of workpieces by the measuring instrument, and generation of training data by the training data generating unit.

A second aspect of the present disclosure is a machine learning apparatus including the above-described training data generator. The machine learning apparatus includes a training unit configured to perform machine learning based on training data generated by the training data generating unit and generate a trained model for estimating a pick position in a workpiece from an image of an arrangement region of a workpiece. The machine learning apparatus includes an inference unit configured to estimate a pick position of a workpiece from an image acquired by the measuring instrument based on a trained model generated by the training unit.

A third aspect of the present disclosure is a method of generating training data used for machine learning. The method of generating training data includes a measurement process in which a measuring instrument measures an arrangement region of a plurality of workpieces and acquires at least one image selected from a group of a two-dimensional image and a three-dimensional image. The method of generating training data includes a movement process in which a movement device moves at least one workpiece and changes an arrangement pattern of a workpiece, and a training data generation process of generating training data including an image acquired in the measurement process and pick position information of a workpiece for picking out a workpiece. In the method of generating training data, a plurality of training data are generated by repeating the movement process, the measurement process, and the training data generation process.

A fourth aspect of the present disclosure is a machine learning method including the above-described method of generating training data. The machine learning method includes a learning process of performing machine learning based on training data generated in the training data generation process and generating a trained model for estimating a pick position in a workpiece from an image of an arrangement region of a workpiece. The machine learning method includes an inference process of estimating a pick position of a workpiece from an image acquired by the measuring instrument based on a trained model generated in the learning process.

Advantageous Effects of Invention

According to the aspects of the present disclosure, it is possible to provide a training data generator and a method of generating training data that can efficiently and realistically generate, corresponding to a real state, training data used for machine learning. In addition, it is possible to provide a machine learning apparatus including the training data generator and a machine learning method including the method of generating training data.

DESCRIPTION OF EMBODIMENTS

With reference to FIG. 1 to FIG. 11, a training data generator, a method of generating training data, a machine learning apparatus, and a machine learning method in an embodiment will be described. In a robot system of the present embodiment, a robot device conveys a plurality of workpieces arranged on a floor surface, a pallet, or the like to a predetermined target position.

The machine learning apparatus of the present embodiment generates a trained model for calculating a pick position and orientation for picking out a workpiece based on an image in which an arrangement region of a plurality of workpieces is imaged. The machine learning apparatus of the present embodiment performs supervised learning. The robot system calculates the pick position and orientation of a workpiece based on an image acquired by a measuring instrument such as a vision sensor and a trained model generated by machine learning performed in advance. Then, the robot system controls the position and orientation of the robot in response to the pick position and orientation of the workpiece calculated by the machine learning apparatus. The training data generator of the present embodiment generates training data as training data for generating a trained model.

(First Training Data Generator)

Figure 1:
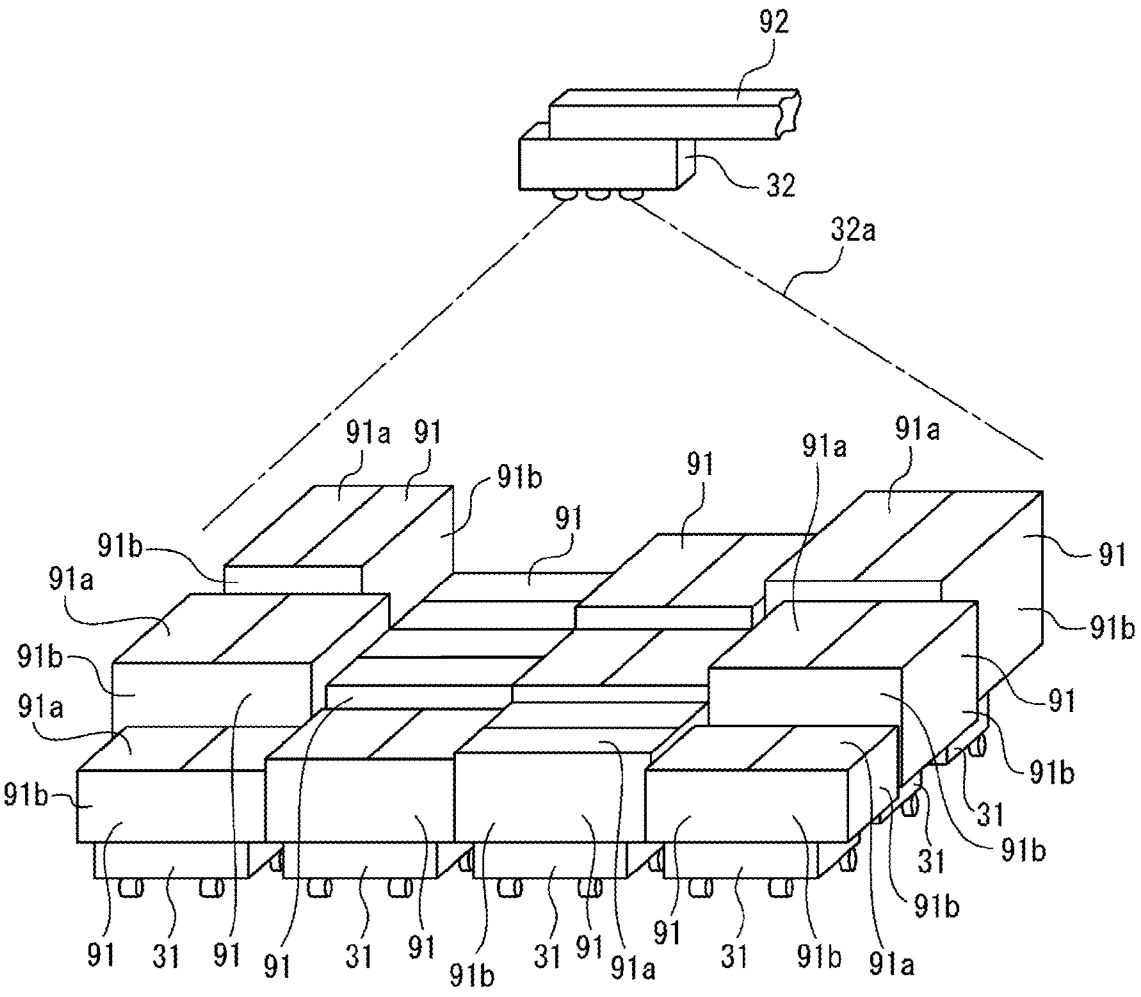
FIG. 1 is a perspective view of a first training data generator in an embodiment.
Figure 2:
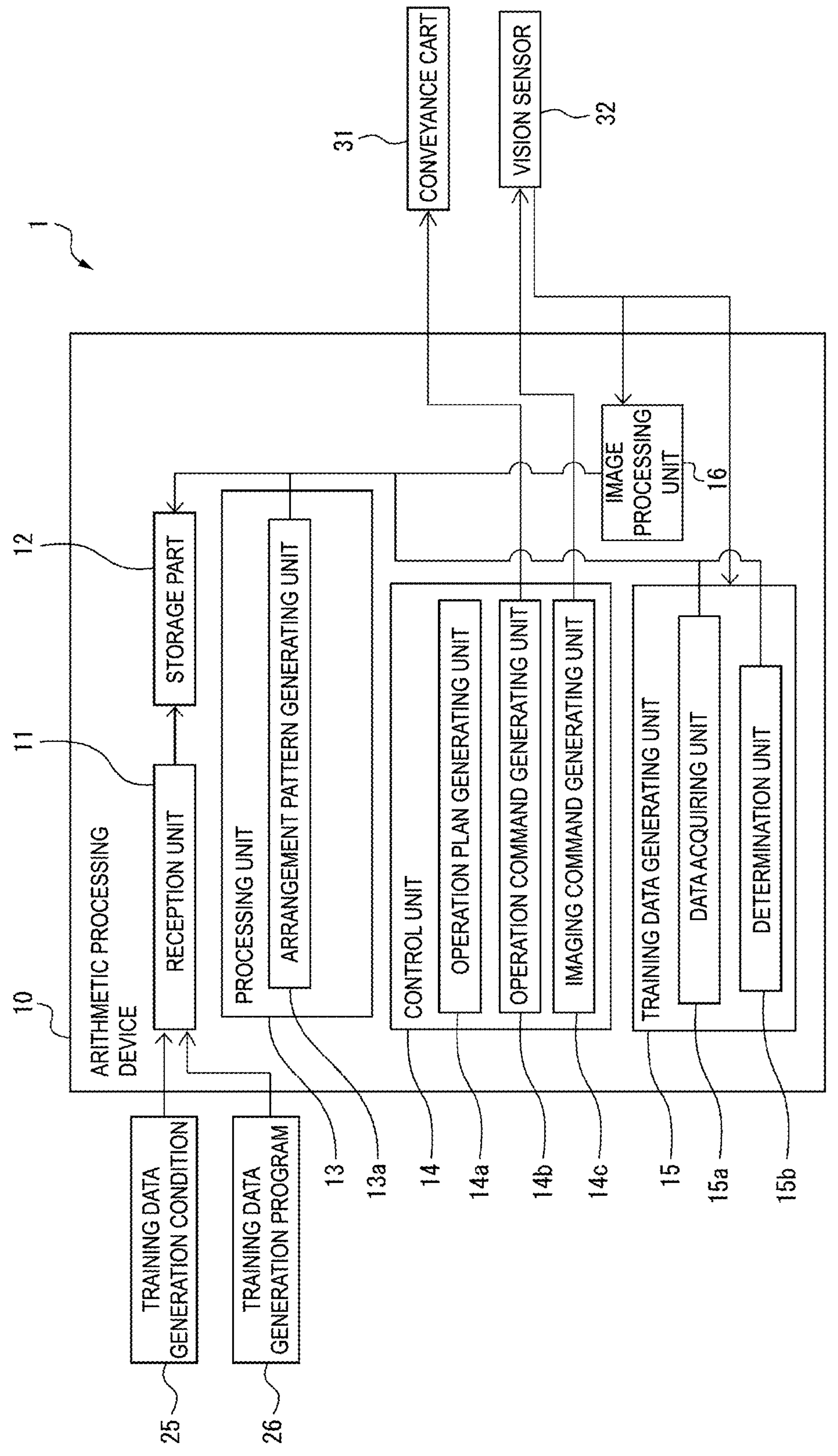
FIG. 2 is a block diagram of the first training data generator in the embodiment.

FIG. 1 is a perspective view of a plurality of conveyance carts that are movement devices constituting the first training data generator of the present embodiment, a plurality of workpieces, and a vision sensor that is a measuring instrument. FIG. 2 is a block diagram of the first training data generator of the present embodiment. In the present embodiment, an example using a cuboid workpiece will be described. Such a workpiece corresponds to corrugated cardboard, for example. However, the workpiece is not limited to this form, and a workpiece having an arbitrary shape can be adopted.

A first training data generator 1 includes a vision sensor 32 as a measuring instrument configured to measure an arrangement region as a region in which a plurality of workpieces 91 are arranged and acquire at least one image selected from a group of a two-dimensional image and a three-dimensional image. The vision sensor 32 images the plurality of workpieces 91 and the background of the workpieces 91. In the first training data generator 1, a two-dimensional camera configured to image a two-dimensional image is arranged as the vision sensor 32. The vision sensor 32 of the present embodiment is arranged above the region in which the plurality of workpieces 91 are arranged, but the embodiment is not limited to this. The vision sensor 32 may be arranged obliquely above a region in which the plurality of workpieces 91 are arranged.

The plurality of workpieces 91 are arranged inside a visual field 32*a* of the vision sensor 32. The vision sensor 32 is fixed to and supported by a support member 92. The support member 92 is fixed to a stand (not illustrated) fixed to the environment, but the embodiment is not limited to this. The support member 92 may be fixed to a movement mechanism (not illustrated) that can move relative to the stand fixed to the environment. The movement mechanism can include a mechanism driven by a motor or one robot device. The vision sensor 32 in the present embodiment is configured so as to image an upper surface 91*a* of the workpiece 91, but the embodiment is not limited to this. The vision sensor 32 may be configured so as to image the upper surface 91*a* and a side surface 91*b* of the workpiece 91 while moving, accompanying the operation of the above-described movement mechanism. In addition, the vision sensor 32 also images the background of the plurality of workpieces 91.

The training data generator 1 includes a conveyance system including one or more conveyance carts 31 as movement devices configured to move at least one workpiece. The conveyance cart 31 travels on the floor surface in a state of carrying one or more workpieces 91. In addition, the conveyance cart 31 may be configured so as to be able to move up and down the workpiece or tilt the workpiece by moving up and down while traveling. The conveyance cart 31 in the present embodiment is an automatic guided vehicle (AGV) configured to travel autonomously. The conveyance system of the present embodiment includes the plurality of conveyance carts 31.

The training data generator 1 includes an arithmetic processing device 10 configured to control the plurality of conveyance carts 31 and the vision sensor 32 and generate training data. The arithmetic processing device 10 is formed of a digital computer including a central processing unit (CPU) as a processor. The arithmetic processing device 10 includes a random access memory (RAM) and a read only memory (ROM) connected to the CPU via a bus.

The arithmetic processing device 10 includes a storage part 12 configured to store arbitrary information regarding generation of training data. The storage part 12 stores data such as an image acquired by the vision sensor 32. The storage part 12 can be formed of a non-transitory storage medium that can store information. The storage part 12 can be formed of a storage medium such as a volatile memory, a nonvolatile memory, a magnetic storage medium, or an optical storage medium.

For example, the storage part can be formed of a hard disk drive (HDD) or a solid state drive (SSD) arranged in an edge device or a cloud. Alternatively, the storage part may include a storage medium such as a universal serial bus (USB) memory connected to the edge device. The storage part may be arranged in another arithmetic processing device, a server, or a cloud connected to the arithmetic processing device via a telecommunication line.

The arithmetic processing device 10 includes a reception unit 11 configured to acquire information from the outside. The reception unit 11 acquires a predetermined training data generation condition 25 and a predetermined training data generation program 26 by an operation of an input device such as a keyboard and a mouse from a worker, for example. The input device may include a display panel of a touch-screen type. Alternatively, the reception unit 11 may acquire information from the outside (e.g., a server) in the form of a file.

The arithmetic processing device 10 includes a processing unit 13 configured to perform preprocessing of generating an arrangement pattern before the vision sensor 32 images an image. The processing unit 13 includes an arrangement pattern generating unit 13*a* configured to generate an arrangement pattern of the plurality of workpieces 91. The arrangement pattern generating unit 13*a* generates the arrangement pattern of the workpiece based on the training data generation condition 25.

The arithmetic processing device 10 includes a control unit 14 configured to control the operations of the plurality of conveyance carts 31. The control unit 14 includes an operation plan generating unit 14*a* configured to generate an operation plan for the plurality of conveyance carts 31 with the position and orientation of each workpiece in each of the plurality of arrangement patterns of the plurality of workpieces generated by the arrangement pattern generating unit 13*a* as target values. The control unit 14 includes an operation command generating unit 14*b* configured to generate a plurality of operation commands for operating the plurality of conveyance carts 31 based on the operation plan for the plurality of conveyance carts 31 generated by the operation plan generating unit 14*a*. The plurality of operation commands generated by the operation command generating unit 14*b* are transmitted to the plurality of conveyance carts 31 by wireless communication. Each of the conveyance carts 31 moves the workpiece 91 in response to the operation command.

The control unit 14 includes an imaging command generating unit 14*c* configured to transmit an imaging start command to the vision sensor 32. The imaging command generating unit 14*c* transmits an imaging start command to the vision sensor 32 after the conveyance carts 31 are arranged at respective target positions defined in the operation plan. Based on the imaging start command, the vision sensor 32 images an arrangement region in which the plurality of workpieces 91 placed on the plurality of conveyance carts are arranged.

The arithmetic processing device 10 includes a training data generating unit 15 configured to generate training data including an image acquired by the vision sensor 32 and pick position information of a workpiece for picking out a workpiece. The training data generating unit 15 includes a data acquiring unit 15*a* configured to acquire data for generating training data. The data acquiring unit 15*a* acquires an image imaged by the vision sensor 32. The data acquiring unit 15*a* acquires pick position information of a workpiece to be held by a hand in order to perform the work of conveying the workpiece by the robot device. The data acquiring unit 15*a* can calculate the extraction position of each of the plurality of workpieces 91 based on the arrangement pattern of the plurality of workpieces 91 generated by the arrangement pattern generating unit 13*a*. The data acquiring unit 15*a* can calculate pick position information as position information of a workpiece for each of the workpieces 91.

The training data generating unit 15 of the arithmetic processing device 10 includes a determination unit 15*b* configured to determine whether to save or discard training data based on a predetermined determination criterion for acceptance of training data. The determination unit 15*b* determines whether or not training data including the pick position and orientation of a workpiece, the outer shape of a workpiece, and an image of a workpiece is appropriate for performing learning. Examples of the determination criterion include whether the image is not defocused, not too dark, or not too bright, there are not many overlapping images, and there are not many images in which a workpiece is not appearing. When the training data satisfies the determination criterion, the training data is stored in the storage part 12. When the training data does not satisfy the determination criterion, the determination unit 15*b* discards the training data.

The arithmetic processing device 10 includes an image processing unit 16 configured to perform image processing on an image imaged by the vision sensor 32. For example, when acquiring a two-dimensional image from the vision sensor 32, the image processing unit 16 estimates a pick position and orientation of a workpiece in the two-dimensional image by performing pattern matching of the two-dimensional image.

The reception unit 11, the processing unit 13, and the arrangement pattern generating unit 13*a* included in the processing unit 13 correspond to a processor driven in response to the training data generation program 26. In addition, the control unit 14, and the operation plan generating unit 14*a*, the operation command generating unit 14*b*, and the imaging command generating unit 14*c* included in the control unit 14, correspond to a processor driven in response to the training data generation program 26. The image processing unit 16, the training data generating unit 15, and the data acquiring unit 15*a* and the determination unit 15*b* included in the training data generating unit 15 correspond to a processor driven in response to the training data generation program 26. The processor functions as each unit by performing processing defined in the training data generation program 26.

Figure 3:
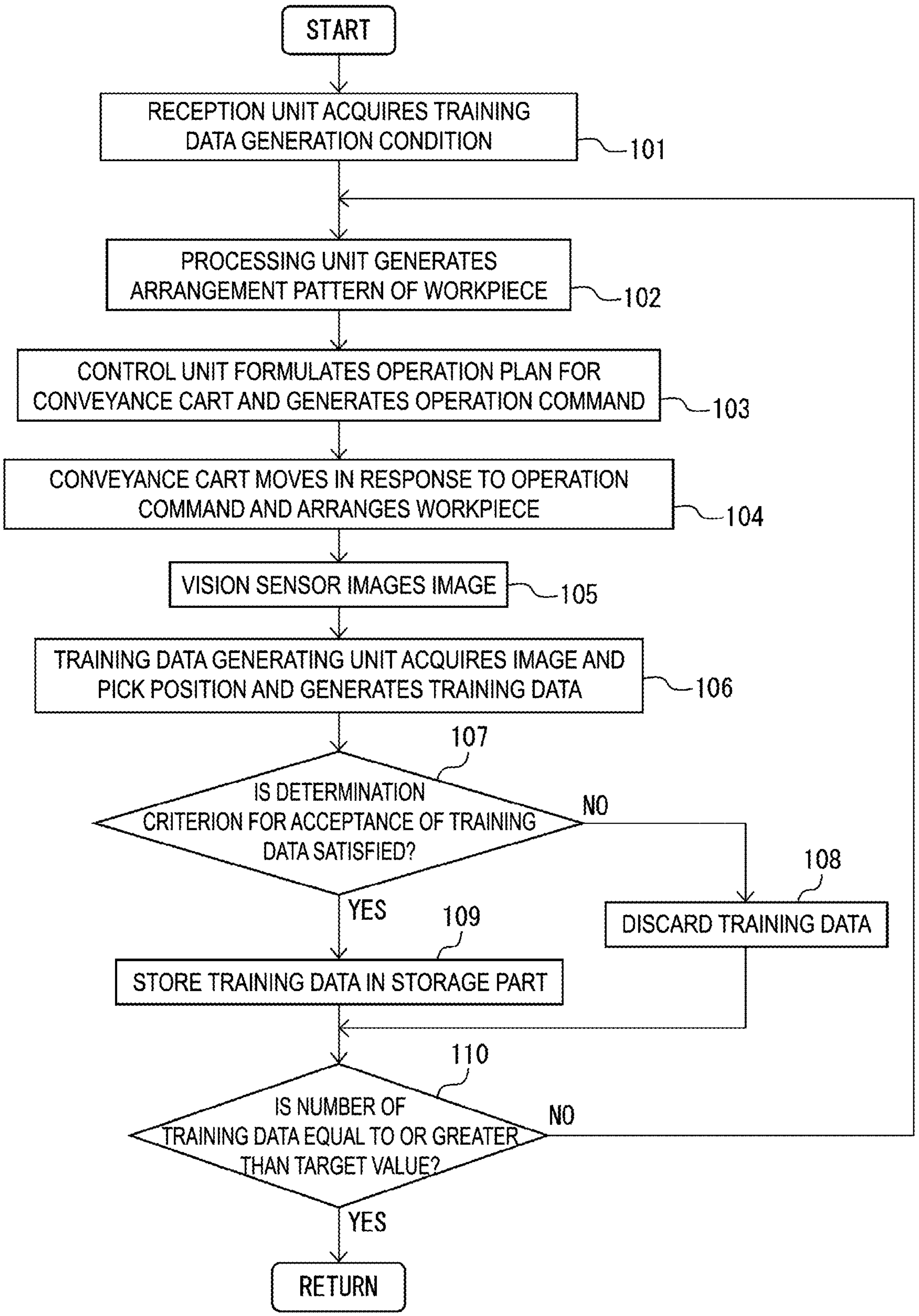
FIG. 3 is a flowchart showing control of the first training data generator.

FIG. 3 shows a flowchart of control of the method of generating training data in the present embodiment. With reference to FIG. 1 to FIG. 3, in step 101, the reception unit 11 acquires the training data generation condition 25. The training data generation condition 25 includes at least one selected from a group of, for example, a target value of the number of training data, a range of the number of types of workpieces, a range of a size of workpieces, and a condition of an arrangement pattern of workpieces. The condition of the arrangement pattern of the workpieces can include at least one selected from a group of a range of the number of layers on which the plurality of workpieces are stacked and a condition of a gap between the workpieces. In addition, the training data generation condition 25 may include information on the outer shape, the size, and the number of actual workpieces used in generation of training data.

The worker can designate a desired training data generation condition 25 via the input device. For example, the worker can designate the target value of the number of training data as 100 sets. The worker can set the range of the number of types of workpieces to equal to or greater than one type to equal to or less than 15 types. As a range of the size of the workpiece, the worker can set the width, the height, and the depth to from equal to or greater than 150 mm to equal to or less than 800 mm.

The worker can designate the condition of the arrangement pattern of the workpieces so that the workpieces overlap in a range of equal to or greater than one layer to equal to or less than five layers. The gap between workpieces can be set to, for example, from equal to or greater than 5 mm to equal to or less than 10 mm. The training data generation condition 25 received by the reception unit 11 is stored in the storage part 12.

Next, in step 102, the arrangement pattern generating unit 13*a* of the processing unit 13 generates a plurality of arrangement patterns of a plurality of workpieces. The arrangement pattern generating unit 13*a* in the present embodiment is configured so as to execute a three-dimensional simulation. The arrangement pattern generating unit 13*a* generates a plurality of arrangement patterns of a plurality of workpieces by three-dimensional simulation based on the training data generation condition 25. For example, one arrangement pattern of the plurality of workpieces 91 in 3 rows and 4 columns as illustrated in FIG. 1 is generated. The arrangement pattern generating unit is not limited to the arrangement pattern in which the stacked layer of the workpiece is one layer as illustrated in FIG. 1, and may generate an arrangement pattern of equal to or greater than two layers.

The arrangement pattern generating unit 13*a* can be formed of a three-dimensional simulation device using a three-dimensional CAD model generated by three-dimensional CAD software, for example. The arrangement pattern generating unit 13*a* generates the arrangement pattern based on the training data generation condition 25 using the three-dimensional CAD model of the workpiece in a virtual three-dimensional environment generated by the simulation device. The arrangement pattern generating unit 13*a* can generate a virtual three-dimensional space so as to correspond to a region in which the workpiece is imaged as illustrated in FIG. 1. Then, a plurality of arrangement patterns in which a plurality of workpieces is arranged inside a region in which the workpiece can be imaged are generated.

For example, the arrangement pattern generating unit 13*a* generates, by the three-dimensional CAD software, for example, CAD models of, for example, 60 workpieces within 15 types of ranges in which the width, the height, and the height of the workpieces are from equal to or greater than 150 mm to equal to or less than 800 mm and the sizes are different from one another. The plurality of arrangement patterns can be generated using these CAD models of the 60 workpieces, and for example, the plurality of arrangement patterns can be generated such that the CAD models of the 60 workpieces can be stacked within a range of equal to or greater than one layer to equal to or less than five layers. In addition, the arrangement pattern can be generated such that the gap between the CAD models of the workpieces are within a range from equal to or greater than 5 mm to equal to or less than 10 mm. The arrangement pattern generating unit 13*a* may generate, for example, 100 sets of arrangement patterns.

As described above, the arrangement pattern generating unit 13*a* can generate an arbitrary arrangement pattern configured to satisfy the training data generation condition 25. The arrangement pattern generating unit 13*a* can generate an arrangement pattern of a workpiece irregularly such that the CAD models of all workpieces are arranged inside the visual field 32*a* of the virtual vision sensor 32 in a virtual three-dimensional simulation environment.

In addition, the arrangement pattern generating unit 13*a* can calculate and output, as a processing result, the three-dimensional position and orientation of each workpiece in each arrangement pattern. For example, in a virtual three-dimensional space generated by the simulation device, a model of the virtual vision sensor is generated in accordance with the actual position and orientation of the vision sensor. In each arrangement pattern, a three-dimensional relative position and relative orientation of each workpiece with respect to the virtual vision sensor are calculated. In other words, the arrangement pattern generating unit 13*a* can calculate the three-dimensional position and orientation of each workpiece in a sensor coordinate system of the virtual vision sensor. For example, a barycentric position of the upper surface 91*a* of the workpiece 91 can be determined as the position of the workpiece 91. The orientation of the upper surface 91*a* of the workpiece 91 can be calculated as the orientation of the workpiece 91. The storage part 12 can store a processing result of the arrangement pattern generating unit 13*a*.

In addition, the arrangement pattern generating unit 13*a* can generate an arrangement pattern of one layer or generate an arrangement pattern of equal to or greater than two layers in which a plurality of workpieces overlap. In addition, the arrangement pattern generating unit 13*a* may generate an arrangement pattern in which no workpiece is arranged inside the visual field (imaging region) of the vision sensor. In other words, an arrangement pattern in which a conveyance cart for conveying a workpiece or only the background such as a pallet or a tray is imaged may be generated.

With reference to FIG. 3, in step 103, the operation plan generating unit 14*a* of the control unit 14 formulates an operation plan for the plurality of conveyance carts 31. The operation plan generating unit 14*a* generates an operation plan for the plurality of conveyance carts 31 based on the processing result of the arrangement pattern generating unit 13*a*. Then, the operation command generating unit 14*b* generates a plurality of operation commands based on the operation plan thus generated.

For example, the arrangement pattern generating unit 13*a* generates 100 sets of different arrangement patterns of a plurality of workpieces. The arrangement pattern generating unit 13*a* calculates and outputs information on the three-dimensional relative position and relative orientation of each workpiece with respect to the virtual vision sensor for each arrangement pattern. With reference to FIG. 1, calibration between the vision sensor 32 configured to perform actual imaging in the real world and the position of an origin at which each of the conveyance carts 31 starts to move is performed in advance. As the origin position of the conveyance cart 31, for example, the position of a charging station of each of the conveyance carts 31 can be adopted.

The operation plan generating unit 14*a* performs a coordinate transformation of the relative position and relative orientation of each of the workpieces 91 with respect to the vision sensor 32 output from the arrangement pattern generating unit 13*a* into the three-dimensional position and orientation of each of the workpieces 91 with respect to the origin position of the conveyance cart 31. In other words, the coordinate value in the sensor coordinate system of the vision sensor 32 can be converted into a coordinate value in a coordinate system with the origin position of the conveyance cart 31 as the origin. Then, with the three-dimensional position and orientation of each of the workpieces 91 with respect to the origin position of the conveyance cart 31 as a target value, the operation plan generating unit 14*a* generates an operation command for the operation of the conveyance cart 31 that carries the workpiece 91 so that each of the workpieces 91 actually reaches. The operation plan generating unit 14*a* performs an operation plan for each of the conveyance carts 31 such that each of the workpieces 91 reaches the target position and orientation generated by the arrangement pattern generating unit 13*a*.

The operation plan generating unit 14*a* can plan the operation of each of the conveyance carts 31 by the above-described method with respect to one arrangement pattern of the plurality of workpieces generated by the arrangement pattern generating unit 13*a*. The operation plan generating unit 14*a* generates an operation plan in which the plurality of conveyance carts 31 move so as not to collide with one another when each of the conveyance carts 31 moves toward the target position and target orientation in a state of having the workpiece 91 placed thereon. For example, the operation plan generating unit 14*a* can generate a plan for moving the conveyance carts 31 one by one to the target position and target orientation. For example, the operation plan generating unit 14*a* can generate a plan for moving one by one the conveyance carts 31 carrying the workpieces so as to arrange the workpieces in order from an end of the arrangement pattern when the arrangement pattern of the workpiece is viewed in plan view from the vision sensor.

Alternatively, the operation plan generating unit 14*a* simultaneously operates the plurality of conveyance carts 31 and calculates the distance between the conveyance carts 31. The operation plan generating unit 14*a* may generate the operation plan for the plurality of conveyance carts 31 so that the distance becomes larger than 0. The operation command generating unit 14*b* of the control unit 14 generates the operation command for each of the conveyance carts 31 based on the operation plan for each of the conveyance carts 31 thus generated.

In step 104, the conveyance cart 31 moves in response to the operation command and conveys the workpiece 91. The workpieces 91 are conveyed by the respective conveyance carts 31 so as to have a predetermined position and orientation in the arrangement pattern generated by the arrangement pattern generating unit 13*a*. There are various methods for controlling the conveyance cart 31 so as to start from a predetermined origin position (e.g., a charging station), in a state of having the workpiece 91 placed thereon, and reach the target position and target orientation. As a method of controlling the conveyance cart based on the operation plan for the conveyance cart, for example, a marker can be attached to the conveyance cart, a vision sensor capable of imaging a space in which the conveyance cart moves can be arranged, a position and orientation of the marker on an image imaged by the vision sensor at regular time intervals can be detected by image processing by an image processing unit described later, and the position and orientation of the conveyance cart can be calculated in real time.

For example, the image processing unit performs image processing on an image imaged by the vision sensor. The position and orientation of the marker, i.e., the current position and orientation of the conveyance cart, are detected from images imaged at regular time intervals. The operation command generating unit calculates differences between the current position and orientation of the conveyance cart and the target position and target orientation so as to reach the three-dimensional target position and target orientation. Then, a target speed vector in which the conveyance cart should move can be calculated based on these differences, and a speed command at which the conveyance cart should move can be calculated as an operation command.

Alternatively, an acceleration sensor may be arranged on the conveyance cart, and the current position may be calculated by integrating twice the current acceleration measured by the acceleration sensor. Alternatively, a global positioning system (GPS) receiver may be arranged in the conveyance cart and the current position of the conveyance cart may be measured. The operation command generating unit may constantly correct the speed command of the conveyance cart based on a real-time measurement result of the GPS device and transmit the corrected speed command to the conveyance cart. In addition, a difference between a plurality of two-dimensional images imaged at regular time intervals by the vision sensor may be compared, and a stop command may be transmitted to the conveyance cart 31 after the four corners of the workpiece 91 completely appear in the two-dimensional images.

Next, in step 105, the imaging command generating unit 14*c* of the control unit 14 transmits, to the vision sensor 32, an imaging start command for imaging an image. The vision sensor 32 images an image after one arrangement pattern generated by the arrangement pattern generating unit 13*a* is completed. In this case, a two-dimensional image is imaged. A two-dimensional image can be image data constituted by one image including images of the upper surfaces 91*a* of the plurality of workpieces 91. In addition, when a movement mechanism configured to move the vision sensor 32 is included, the control unit 14 can control the position and orientation of the vision sensor 32 by controlling the operation of the movement mechanism. The two-dimensional image in this case may be image data constituted by one or more images including the upper surfaces 91*a* and the side surfaces 91*b* of the plurality of workpieces 91.

Next, in step 106, the data acquiring unit 15*a* of the training data generating unit 15 acquires a two-dimensional image imaged by the vision sensor 32. In addition, the data acquiring unit 15*a* of the training data generating unit 15 acquires the position and orientation of each workpiece from the arrangement pattern generating unit 13*a*. The data acquiring unit 15*a* acquires the position and orientation of each of the workpieces 91 in the sensor coordinate system of the vision sensor 32, for example. Then, the data acquiring unit 15*a* acquires the size of the workpiece and the outer shape of the workpiece from the arrangement pattern generating unit 13*a*. Then, the data acquiring unit 15*a* calculates the pick position and orientation of the workpiece in order for the robot device to perform a work of picking out the workpiece. Next, in addition to image data, the training data generating unit 15 generates training data including at least one piece of information selected from a group of the pick position and orientation and the outer shape of the workpiece. For example, training data including the image data and pick position information may be generated, training data including the image data and information on the pick position and orientation may be generated, or training data including the image data, the pick position and orientation, and outer shape information of the workpiece may be generated.

Next, in step 107, the determination unit 15*b* of the training data generating unit 15 determines whether or not generated one training data satisfies the determination criterion for acceptance of training data. Based on the result of the image processing by the image processing unit 16, the determination unit 15*b* can determine whether or not the training data including the image imaged by the vision sensor 32 is appropriate for machine learning. The determination criterion for acceptance of these training data can be included in the training data generation condition 25.

For example, the image processing unit 16 performs image processing on an image of a candidate for training data, and detects a workpiece in the image. The determination unit 15*b* calculates the number of images in which no workpiece is detected among the images of training data generated so far. In other words, the number of images in which no workpiece appears is calculated. When the number of images exceeds a predetermined threshold value (e.g., one), the determination unit 15*b* may determine, as training data of rejection, training data including an image and information such as a pick position corresponding to the image.

Alternatively, the image processing unit 16 calculates a difference between a candidate two-dimensional image imaged this time and a two-dimensional image already imaged, and outputs a calculation result to the storage part 12. The determination unit 15*b* can determine that a plurality of images having a small difference are overlapping images and are training data of rejection. Then, the determination unit 15*b* may leave one set of training data and delete other overlapping training data.

In addition, the image processing unit 16 can calculate brightness, blurring of focus, or the like of a two-dimensional image that is a candidate for training data by performing fast Fourier transform (FFT), for example. The determination unit 15*b* acquires a result of image processing. The determination unit 15*b* selects an image that is too dark, an image that is too bright, or an image that is blurring of focus based on a predetermined determination threshold value. The determination unit 15*b* may determine, as training data of rejection, the training data including these images.

In step 107, when the generated training data satisfies the determination criterion for acceptance of training data, the control moves on to step 109. In step 109, the storage part 12 stores training data. In step 107, when the generated training data does not satisfy the determination criterion for acceptance of training data (case of rejection), the control transitions to step 108. In step 108, the determination unit 15*b* discards the training data. After all training data generated by the training data generating unit are stored in the storage part 12, the determination unit 15*b* may discard training data that does not satisfy the determination criterion of training data.

Next, in step 110, the determination unit 15*b* determines whether or not the number of training data of acceptance stored in the storage part 12 has reached a predetermined target value. For example, the determination unit 15*b* determines whether or not 100 sets of training data of the target value have been generated. In step 110, when the number of training data has reached the target value, the determination unit 15*b* determines that the number of training data is of acceptance. In other words, it can be determined that necessary training data has been generated in order to perform machine learning. Then, this control is ended.

On the other hand, in step 110, when the number of training data is less than the target value, the control returns to step 102. In step 102, the arrangement pattern generating unit 13*a* generates another arrangement pattern. Alternatively, when a plurality of arrangement patterns have already been generated, the arrangement pattern generating unit 13*a* selects a new arrangement pattern that has not been selected. Then, the control from step 102 to step 110 is repeatedly performed until the number of training data reaches the target value.

As described above, the training data generator of the present embodiment performs the control so as to repeat the control of moving the workpieces 91 by the conveyance cart 31 in order to change the arrangement pattern of the plurality of workpieces 91, the imaging of an arrangement region in which the plurality of workpieces 91 are arranged by the vision sensor 32, and generation of training data by the training data generating unit 15. The method of generating training data of the present embodiment includes the measurement process in which the vision sensor 32, which is a measuring instrument, images an arrangement region in which the plurality of workpieces 91 are arranged, and acquires at least one image selected from a group of a two-dimensional image and a three-dimensional image, and the movement process in which the conveyance cart 31 moves at least one workpiece 91 and changes an arrangement pattern of a workpiece. The method of generating training data includes a training data generation process of generating training data including an image imaged by the vision sensor and pick position information of a workpiece for picking out a workpiece. Then, a plurality of training data are generated by repeating the movement process, the measurement process, and the training data generation process.

The training data generator and the method of generating training data of the present embodiment can efficiently generate training data. In particular, for a heavy workpiece or a large workpiece, it is possible to automate transportation work necessary when an arrangement pattern of the plurality of workpieces is changed. The burden on the worker can be reduced and the working time can be shortened. For example, as the heavy workpiece, a workpiece of equal to or greater than 10 kg or a workpiece of equal to or greater than 20 kg that is a heavy load when conveyed by one worker can be exemplified. As the large workpiece, a workpiece having a diameter of equal to or greater than 1 m or a workpiece having a diameter of equal to or greater than 2 m that is a heavy load when conveyed by one worker can be exemplified.

In the training data generator and the method of generating training data of the present embodiment, training data is generated using an image of a workpiece handled not in simulation but in actual work. Therefore, it is possible to generate real training data reflecting an illumination condition, a variation in manufacturing of a workpiece, deformation of a workpiece during conveyance, and the like. Use of such real training data for machine learning makes it possible to correctly detect a workpiece in response to various situations in an actual real environment. As a result, failure in holding a workpiece can be suppressed, and work efficiency can be improved.

In addition, it is also possible to collect and learn image data in a case where detection of a workpiece fails or a workpiece is not detected. It is possible to generate training data closer to actual work. In addition, an image in which a background on which a workpiece is arranged in actual work appears can also be used as training data. In particular, when a plurality of workpieces overlap one another, an image including a surrounding workpiece serving as a background can be included in training data. In this case, it is difficult to distinguish between a surrounding workpiece close to the target workpiece to be picked out and the target workpiece, and thus it is possible to generate training data including a relationship between the target workpiece to be picked out and a fine and complicated background around thereof. As a result, it is possible to improve the accuracy of detecting a workpiece from an image including a fine and complicated background in machine learning.

Figure 4:
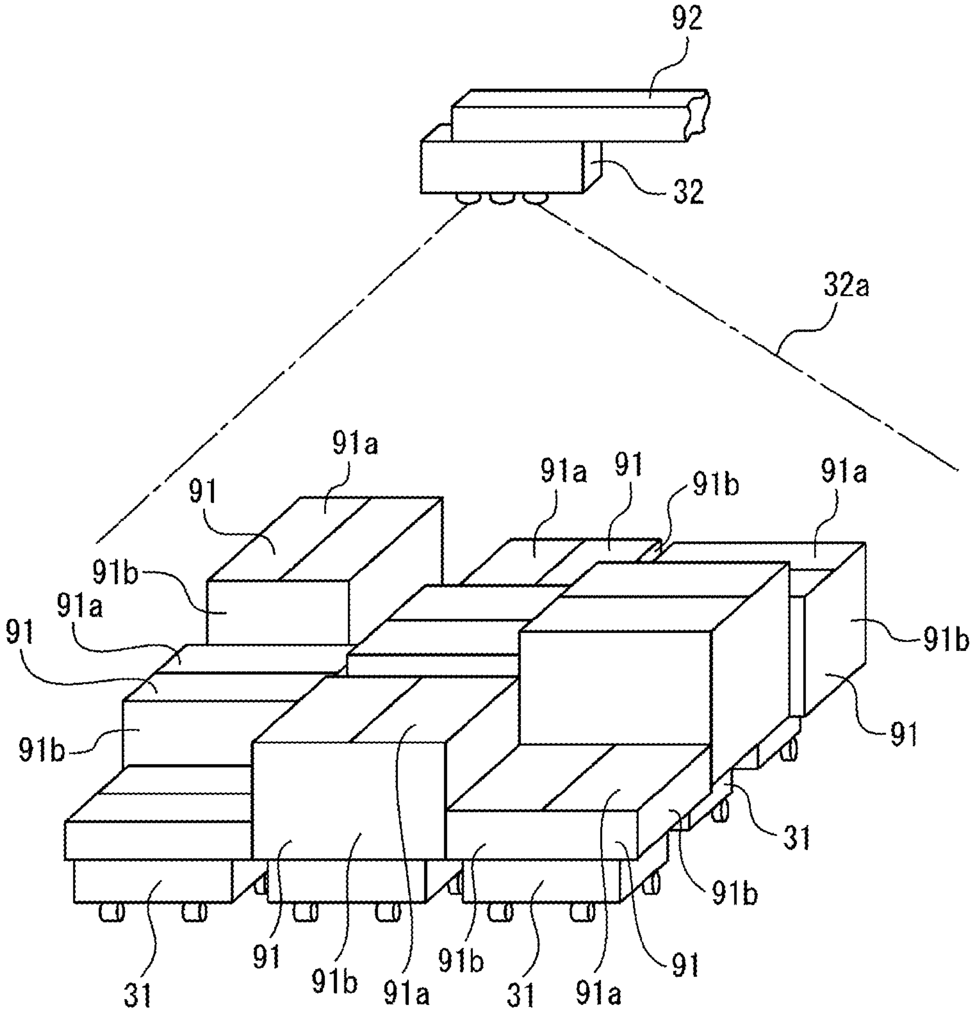
FIG. 4 is a perspective view of the first training data generator when changing an arrangement pattern of a workpiece.

FIG. 4 illustrates a perspective view of a workpiece and the vision sensor after the arrangement pattern of the workpiece is changed once. In the arrangement pattern illustrated in FIG. 4, nine workpieces 91 are arranged inside the visual field 32*a*. On the other hand, in the arrangement pattern illustrated in FIG. 1, twelve workpieces 91 are arranged inside the visual field 32*a*. In each arrangement pattern, the type (size) and number of workpieces arranged inside the visual field 32*a*, and the position and orientation of the workpiece are different from each other.

As described above, the arrangement pattern of the workpiece can be changed in an arbitrary form. For example, the number of workpieces can be increased one by one from a state where no workpiece 91 is arranged. Alternatively, the number of workpieces inside the visual field 32*a* imaged by the vision sensor 32 may be reduced. When the arrangement pattern is changed, workpieces can be increased or decreased one by one. Alternatively, the arrangement pattern may be changed by increasing or decreasing an arbitrary number of workpieces. In addition to the number of workpieces, for example, the number of layers on which the workpieces are stacked, the number of workpieces arranged on each layer, the number of types of size of the workpieces, the number of workpieces of each size, and the position and orientation of each workpiece may be arbitrarily changed.

In FIG. 1 and FIG. 4, the workpieces are arranged so as to be aligned when viewed from the vision sensor 32, but the embodiment is not limited to this. The workpieces may be arranged such that the orientation of the workpieces when viewed from the vision sensor is irregular. The workpiece 91 may be arranged such that the upper surface 91*a* (a surface with a cut line) of the workpiece 91 when viewed from the vision sensor 32 is inclined. In addition, the workpiece 91 may be arranged such that the side surface 91*b* (a surface without a cut line) of the workpiece when viewed from the vision sensor 32 faces upward.

In addition, the determination unit 15*b* of the training data generating unit 15 may determine whether or not the workpiece is arranged as per the arrangement pattern defined by the arrangement pattern generating unit 13*a*. The arrangement pattern generating unit 13*a* sets an imaging plane with respect to the virtual vision sensor in three-dimensional simulation. The arrangement pattern generating unit 13*a* may be configured so as to output a projection image in which a plurality of workpieces are projected onto the imaging plane. Then, the image processing unit 16 calculates a difference between a projection image output from the arrangement pattern generating unit 13*a* and an image imaged by the vision sensor 32. Then, the determination unit 15*b* may determine whether or not the workpiece is arranged as per the target arrangement pattern generated by simulation based on the determination of whether or not a calculated difference is equal to or less than a predetermined threshold value. For example, when the difference between the projection image and the image imaged by the vision sensor 32 is smaller than a predetermined determination threshold value, the determination unit 15*b* can determine that the workpiece is arranged as per the target arrangement pattern generated by simulation.

In addition, the vision sensor 32 of the training data generator 1 may image a background on which no workpiece exists. For example, the vision sensor 32 may image a container, a tray, a pallet, or the like on which no workpiece is placed. The arrangement pattern generating unit 13*a* may generate an arrangement pattern in which no workpiece is arranged. The training data generating unit 15 may generate training data including an image formed of only a background of a workpiece. Machine learning is performed by putting, in training data, an image in which no workpiece is arranged, whereby a difference from an image in which a workpiece is arranged can be learned well. Therefore, it is possible to reduce the number of failure cases in which noise existing in the background is erroneously detected as a workpiece.

As a two-dimensional camera configured to image a two-dimensional image of a workpiece, any device configured to image a two-dimensional image can be adopted. As a device configured to image a two-dimensional image, a visible light camera such as a camera configured to image a black-and-white image or a camera configured to image a color image can be adopted. Alternatively, an infrared camera configured to image a heated high-temperature metal workpiece, an ultraviolet camera configured to image an ultraviolet image capable of detecting a flaw that cannot be seen with visible light, or the like may be adopted.

The vision sensor of the present embodiment is fixed by the support member, i.e., the position of the vision sensor is fixed, but the embodiment is not limited to this. The vision sensor may be configured to be movable. For example, the vision sensor may be fixed to a support member fixed to a conveyance cart and move together with the conveyance cart. In addition, the vision sensor may be fixed to a hand of an arm of one robot and move together with the hand of the robot.

In addition, in the training data generator 1 of the present embodiment, the conveyance cart 31 is adopted as the movement device configured to move the workpiece 91, but the embodiment is not limited to this. In particular, in the present embodiment, an automatic guided vehicle configured to move autonomously is adopted, but the embodiment is not limited to this. The conveyance cart may be manually moved by a remote operation by the worker or a conveyance cart may be able to be switched between autonomous and manual. As the conveyance cart, a conveyance cart having a wheel drive mechanism or a conveyance cart having a crawler drive mechanism can be adopted. Alternatively, the conveyance cart may have both of these drive mechanisms and move while being autonomously or manually switched in response to the condition of the floor surface.

In addition, the movement device may be configured so as to perform an operation of changing the three-dimensional position and orientation of a workpiece. For example, a coordinate system having an X axis and a Y axis extending in a horizontal direction can be set in the movement device. The movement device can include a locking mechanism configured to hold a workpiece so that positions of the workpiece in the X axis direction and the Y axis direction do not change in a state where the workpiece is placed. Then, the movement device may include a lifting mechanism configured to change the position of the workpiece in a Z axis direction. By adopting this mechanism, the movement device can change the three-dimensional position of a workpiece by moving in the X axis direction and the Y axis direction and driving the lifting mechanism in a state where the workpiece is placed.

In addition, the movement device may include a mechanism configured to change the orientation of a member on which a workpiece is placed. For example, the movement device may be configured so as to include a rotation mechanism (e.g., a hinge, a spring, or the like) that inclines, around the X axis or the Y axis, the member on which a workpiece is placed. Furthermore, by including a mechanism configured to rotate around the Z axis in a state where a workpiece is placed, the movement device can change a three-dimensional orientation of the workpiece. For example, the movement device moves in translation by +10 mm in the X axis direction, −20 mm in the Y axis direction, and +50 mm in the Z axis direction so as to change the position and orientation of the workpiece. Furthermore, it can rotate +20° around the X axis, −30° around the Y axis, and +60° around the Z axis. As described above, the arrangement pattern of a plurality of workpieces can be changed by changing the three-dimensional position and orientation of at least one workpiece. The movement device of the present embodiment can be configured so as to include at least one mechanism of the plurality of mechanisms described above.

In the present embodiment, one workpiece is placed on one conveyance cart, but the embodiment is not limited to this. A plurality of workpieces can be placed on one conveyance cart. For example, a plurality of workpieces can be stacked or juxtaposed on one conveyance cart.

(Robot System Including Machine Learning Apparatus)

Figure 5:
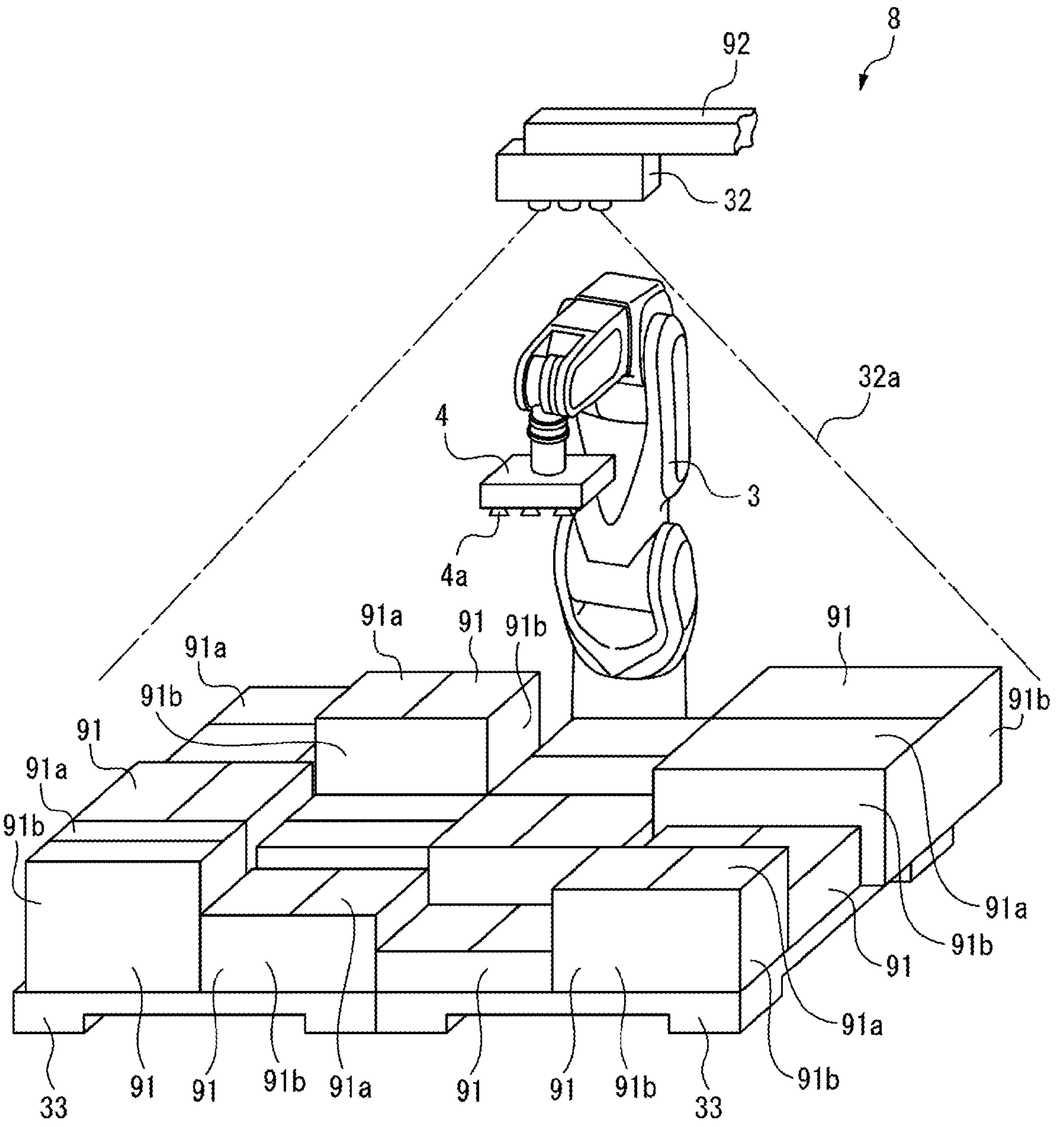
FIG. 5 is a perspective view of a first robot system configured to convey a workpiece using a trained model generated by the training data generator.
Figure 6:
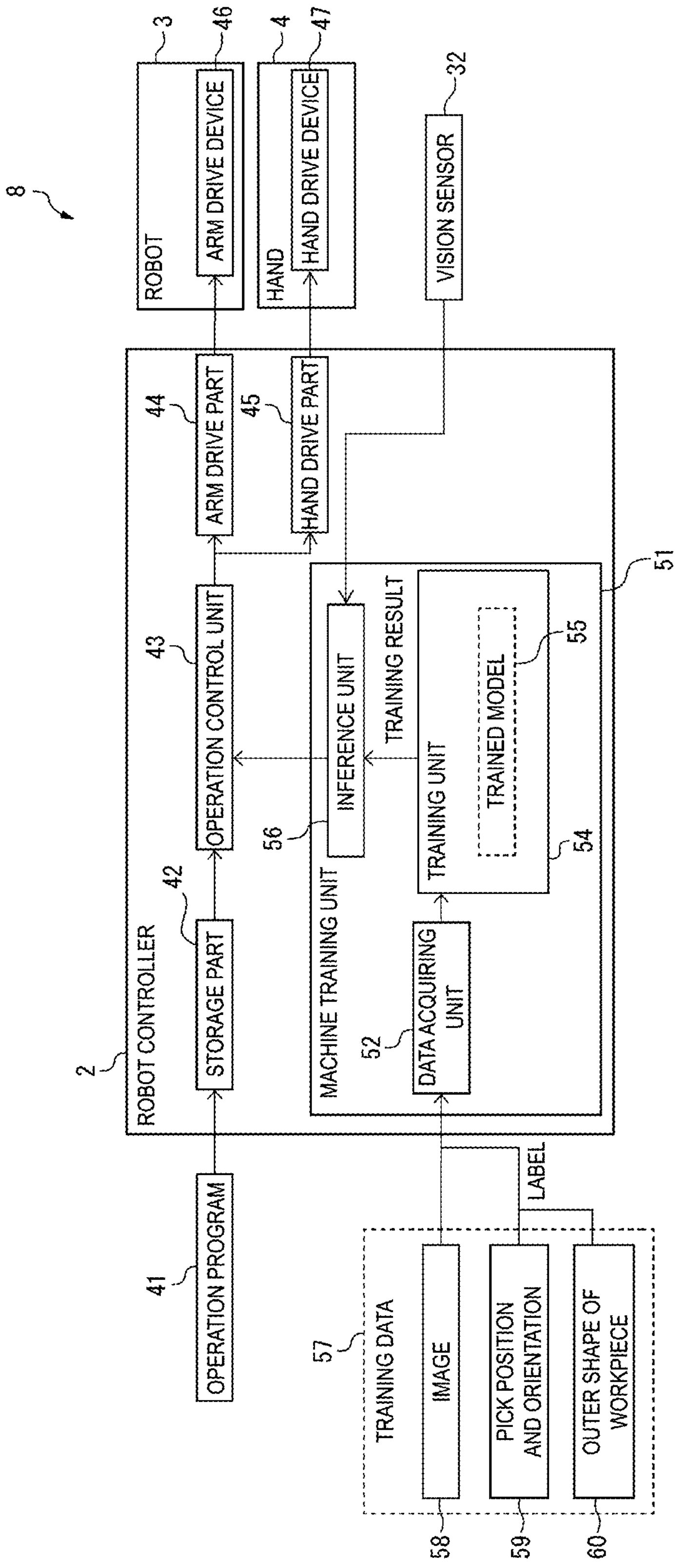
FIG. 6 is a block diagram of the first robot system.

FIG. 5 is a perspective view of a first robot system configured to detect and convey an actual workpiece of the present embodiment. FIG. 6 is a block diagram of the robot system in the present embodiment. With reference to FIG. 5 and FIG. 6, a first robot system 8 includes a robot device including a robot 3 and a hand 4. The robot 3 in the present embodiment is an articulated robot having a plurality of joint portions. The hand 4 of the present embodiment includes a suction pad 4*a*. The hand 4 is configured so as to hold the workpiece 91 by suction. The robot device is not limited to this form, and a robot device including an arbitrary robot and hand capable of conveying a workpiece can be adopted.

The robot system 8 includes the vision sensor 32 configured to image an arrangement region of the workpiece 91. When the work of actually conveying the workpiece 91 is performed, the plurality of workpieces 91 arranged on a pallet 33 in an arrangement region is conveyed by an arbitrary method. The workpiece 91 may be corrugated cardboard containing products arriving at a warehouse of a distribution center, for example. The workpiece 91 is placed on the pallet 33 and conveyed to a region in which the robot device works.

The vision sensor 32 images an arrangement region in which the plurality of workpieces 91 are arranged. The vision sensor 32 is fixed to the support member 92. The vision sensor 32 is fixed such that all the workpieces 91 are arranged inside the visual field 32*a*, but the embodiment is not limited to this. The vision sensor 32 may be fixed to the hand of the robot 3 together with the support member 92 and moved along with the operation of the robot 3. Similarly to the training data generator, the vision sensor 32 is arranged above the region in which the workpiece 91 is arranged so as to mainly image the upper surface 91*a* of the workpiece 91, but the embodiment is not limited to this. The vision sensor 32 may be arranged obliquely above a region in which the workpiece 91 is arranged so as to image the upper surface 91*a* and the side surface 91*b* of the workpiece 91. Alternatively, the vision sensor 32 may be arranged so as to image the upper surface 91*a* and the side surface 91*b* of the workpiece 91 while being moved along with the operation of the robot 3. As the vision sensor 32, a two-dimensional camera, a three-dimensional camera, and a measuring instrument including a two-dimensional camera and a three-dimensional measuring instrument can be adopted.

The robot system 8 includes a robot controller 2 (not illustrated) configured to control a robot device. The robot controller 2 includes an arithmetic processing device (computer) including a central processing unit (CPU) as a processor. The robot controller 2 includes a storage part 42 configured to store arbitrary information regarding the robot system 8. Similarly to the storage part 12 of the arithmetic processing device 10, the storage part 42 can be formed of a non-transitory storage medium that can store information.

The robot controller 2 may receive an operation program 41 generated in advance in order to perform operations of the robot 3 and the hand 4, or may be configured so as to internally generate the operation program 41. An operation control unit 43 transmits, to an arm drive part 44, an operation command for driving the robot 3 based on the operation program 41. The arm drive part 44 includes an electric circuit configured to drive a drive motor, and gives an electric command to an arm drive device 46 based on the operation command. In addition, the operation control unit 43 transmits, to a hand drive part 45, an operation command for driving a hand drive device 47. The hand drive part 45 includes an electric circuit configured to drive, for example, an air pump or the like, and gives an electric command to the air pump or the like based on the operation command.

The operation control unit 43 corresponds to a processor driven in response to the operation program 41. The processor functions as the operation control unit 43 by reading the operation program 41 and performing control defined in the operation program 41.

The robot system 8 of the present embodiment includes a machine learning apparatus. The machine learning apparatus of the present embodiment includes the above-described training data generator 1 and the robot controller 2. The robot controller 2 includes a machine training unit 51 configured to perform machine learning. The machine training unit 51 obtains, by learning, characteristics, features, and the like included in training data to be input.

The machine training unit 51 includes a data acquiring unit 52 and a training unit 54 configured to generate a trained model 55. The machine training unit 51 of the present embodiment performs supervised learning. In supervised learning, a plurality of sets of training data 57, i.e., input data (including image data and label data), are input to the machine training unit 51. The machine training unit 51 learns a relationship between image data and label data included in the input data set. The machine training unit 51 generates a model (trained model) for estimating a label from an image, i.e., a model for acquiring a relationship of a label with respect to an image.

In the present embodiment, the data acquiring unit 52 acquires an image 58 included in the training data 57 as an input. In addition, the data acquiring unit 52 acquires, as a label, at least one selected from a group of pick position and orientation 59 included in the training data 57 and an outer shape 60 of a workpiece. For example, the training unit 54 acquires, as input data, 100 sets of the training data 57 including labels. For example, the training unit 54 performs deep learning using training data as input data of region based convolutional neural networks (MASK R-CNN) and generates the trained model 55.

The machine training unit 51 corresponds to a processor driven in response to a program of machine learning. By performing control defined in the program, the processor functions as the machine training unit 51. In addition, each unit of the data acquiring unit 52, the training unit 54, and an inference unit 56 corresponds to a processor driven in response to a program of machine learning.

The data acquiring unit 52 acquires an image imaged by a two-dimensional camera as the image 58, for example. In addition, as the pick position and orientation 59 and the outer shape 60 of a workpiece, the data acquiring unit 52 acquires information on the position and orientation and outer shape information of each workpiece in each of the plurality of arrangement patterns of the plurality of workpieces generated by the arrangement pattern generating unit 13*a*. The training unit 54 can generate the trained model 55 configured to estimate the pick position and orientation of a workpiece and the outer shape of the workpiece from an image of the arrangement region of a workpiece imaged by the two-dimensional camera.

The inference unit 56 acquires the trained model 55 generated by the training unit 54. By using the training data 57 with a two-dimensional image imaged from the vision sensor 32 of the robot system 8 as input data, the inference unit 56 estimates a three-dimensional pick position and orientation of the upper surface 91*a* of the workpiece 91 appearing in the image, for example, and the outer shape of the workpiece.

The pick position and orientation of the workpiece 91 can be calculated in the sensor coordinate system of the vision sensor 32, for example. In the robot device, a world coordinate system that is immovable even when the position and orientation of the robot 3 change is set. Calibration between the sensor coordinate system and the world coordinate system set in the robot device can be performed in advance.

The operation control unit 43 of the robot controller 2 acquires the pick position and orientation of the workpiece 91 expressed in the sensor coordinate system from the inference unit 56. The operation control unit 43 converts the pick position and orientation of the workpiece 91 expressed in the world coordinate system. When the pick position and orientation 59 of a workpiece as label data of the training data 57 have already been expressed in the world coordinate system, the operation control unit 43 of the robot controller 2 acquires the pick position and orientation of the workpiece 91 expressed in the world coordinate system from the inference unit 56. The operation control unit 43 calculates the positions and orientations of the robot and the hand when the robot picks out a workpiece based on the pick position and orientation of the workpiece expressed in the world coordinate system. The operation control unit 43 can control the robot 3 and the hand 4 so as to hold the workpiece 91.

The operation control unit 43 can perform a work of picking out the workpiece 91 in a predetermined order. For example, the operation control unit 43 performs control of holding and conveying the workpiece 91 to a predetermined position, in order from the workpiece 91 arranged at an end of an arrangement pattern or the highest position. For example, the robot device can convey each of the workpieces 91 to a conveyor arranged on a side of a work region in which the workpiece 91 is arranged.

As described above, the machine learning apparatus of the present embodiment includes the training data generator configured to generate training data. The machine learning apparatus includes the training unit configured to generate a trained model for estimating a pick position in a workpiece from an image of an arrangement region of the workpiece. The training unit performs machine learning based on training data generated by the training data generating unit. The machine learning apparatus includes an inference unit configured to estimate a pick position of a workpiece from an image acquired by the measuring instrument. In addition, the machine learning method includes a learning process of generating a trained model for estimating a pick position in a workpiece from an image of an arrangement region of the workpiece based on training data generated by the above-described method of generating training data. In the learning process, machine learning is performed based on training data generated in the training data generation process. The machine learning method includes an inference process of estimating a pick position of a workpiece from an image acquired by the measuring instrument based on a trained model generated in the learning process. In the machine learning apparatus or the machine learning method of the present embodiment, since training data generated by the training data generator of the present embodiment is used, it is possible to generate a trained model having excellent accuracy of estimating a pick position. Alternatively, the inference unit can accurately estimate a pick position from an image of an arrangement region of a workpiece.

As training data used for machine learning, an image imaged in the past, pick position information, and the like may be configured to be acquired. For example, the training data generating unit may acquire an image, a pick position and orientation of a workpiece, and outer shape information from a cloud or a database of a predetermined device. In addition, the training data generating unit may acquire, via a network such as a local area network (LAN), a two-dimensional image, pick position information, or the like recorded in a storage medium such as a memory. Alternatively, the training data generating unit may be configured so as to remotely acquire, via a network, an image imaged by a vision sensor installed at a remote location, pick position information, and the like.

The machine learning apparatus of the present embodiment performs supervised learning, but the embodiment is not limited to this, and can perform arbitrary machine learning. For example, machine learning such as semi-supervised learning, unsupervised learning, or reinforcement learning can be performed using training data generated by the training data generator.

Figure 7:
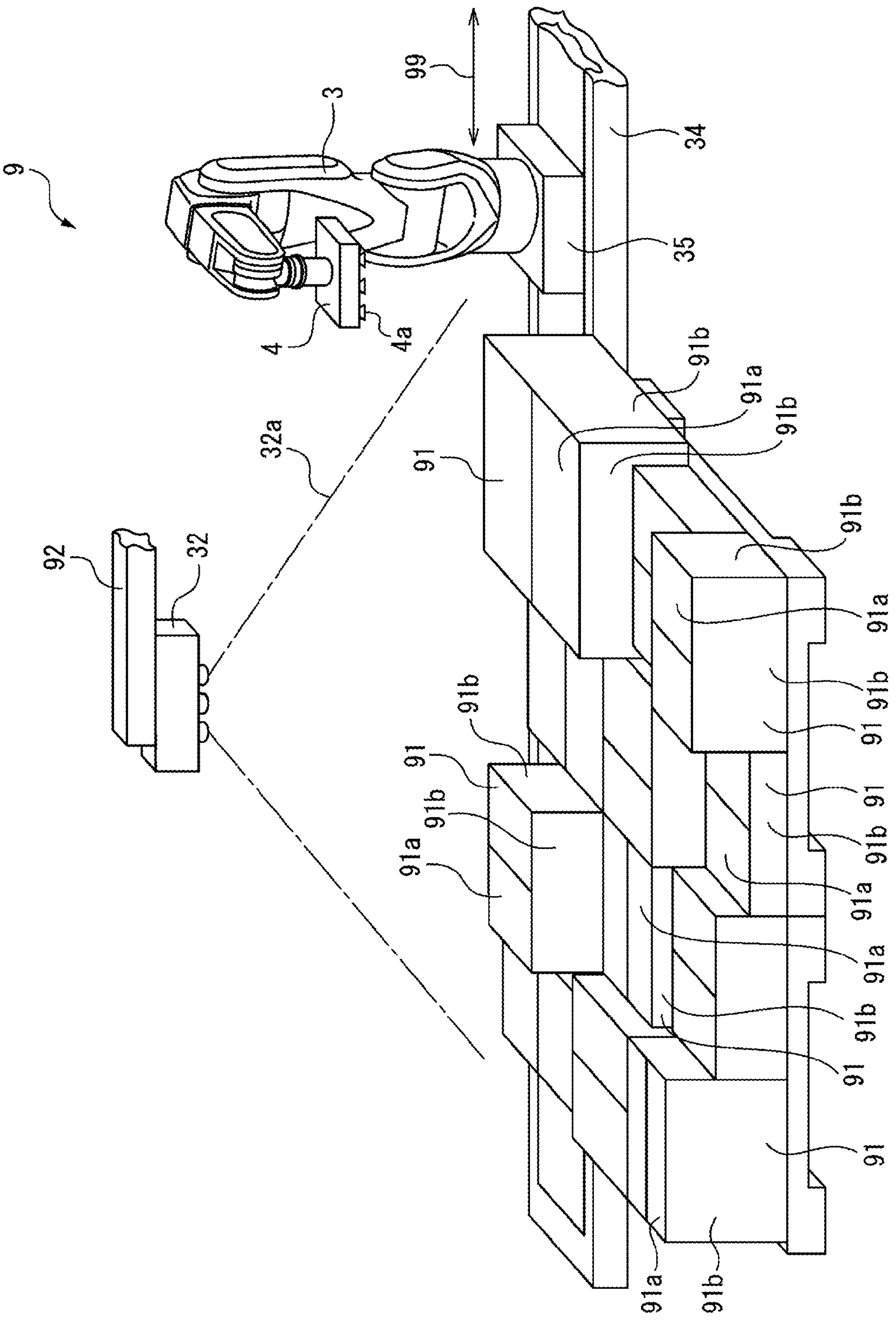
FIG. 7 is a perspective view of a second robot system configured to convey a workpiece using a trained model generated by the training data generator.

FIG. 7 is a perspective view of a second robot system configured to perform actual work in the present embodiment. In the first robot system 8 described above, the position of the robot device is fixed, but the embodiment is not limited to this. The second robot system 9 includes a slide device 34 for moving the robot 3. The slide device 34 includes a movement table 35 to which the robot 3 is fixed. As indicated by an arrow 99, the movement table 35 is configured so as to be movable in a direction in which the slide device 34 extends.

As described above, the robot 3 may be fixed to a device that is formed movably. By adopting this configuration, even the robot 3 having a short stroke can pick out all workpieces. In other words, the robot can be downsized. In the second robot system 9, a slide device is adopted as a device configured to move the entire robot, but the embodiment is not limited to this. A conveyance cart may be adopted as a device configured to move the entire robot, for example. In other words, the robot may be fixed to the conveyance cart and formed movable in an arbitrary direction.

(Second Training Data Generator)

A second training data generator in the present embodiment will be described. The configuration of the second training data generator is similar to the configuration of the first training data generator 1 (see FIG. 1 and FIG. 2). In the first training data generator 1, as the pick position and orientation 59 of a workpiece included in the training data 57, a three-dimensional pick position and orientation calculated by simulation executed by the arrangement pattern generating unit 13*a* are adopted. In addition, information of a three-dimensional CAD model of the workpiece used in the simulation is used for the outer shape 60 of the workpiece.

As illustrated in FIG. 1, an arrangement pattern is generated by move of the conveyance cart 31 on which the workpiece 91 is actually placed. However, the position and orientation of the workpiece 91 conveyed by the conveyance cart 31 may slightly deviate from the position and orientation of a workpiece calculated by simulation. Hereinafter, a method of correcting and calculating this deviation amount will be described.

With reference to FIG. 2, in the second training data generator, the image processing unit 16 performs image processing on a two-dimensional image acquired by the vision sensor 32. The above-described projection image generated by the arrangement pattern generating unit 13*a* is a projection image of an arrangement pattern generated so as to satisfy the training data generation condition 25 designated by the worker, and is an image strictly reflecting the intention of the worker. This projection image is saved in the storage part 12 as a reference image. In each reference image, a pick position of each workpiece is calculated and determined by the simulation device.

By calculating a difference between a two-dimensional image in which an actual arrangement pattern made by operations of the plurality of conveyance carts 31 in the real world is imaged and a reference image, the image processing unit 16 performs calculation for correcting a difference or a deviation amount from the position and orientation or the outer shape of a workpiece in the reference image, and calculates the pick position of a workpiece and the outer shape of the workpiece in an actually imaged two-dimensional image. This can generate label data (the pick position and orientation, and outer shape information) free from deviation with respect to two-dimensional image data in which an actual arrangement pattern made by the operation of the conveyance cart 31 in the real world is imaged, and can generate excellent training data including label data and image data free from deviation.

The training data generating unit 15 generates training data including a two-dimensional image obtained from the vision sensor 32, and a two-dimensional pick position and orientation of a workpiece and the outer shape of the workpiece in a two-dimensional image detected by the image processing unit 16. With reference to FIG. 6, the training unit 54 of the machine learning apparatus can perform supervised learning using training data. The training unit 54 can generate the trained model 55 configured to estimate the pick position and orientation of a workpiece and the outer shape of the workpiece in a two-dimensional image from the two-dimensional image.

For example, 100 two-dimensional images are acquired for an arrangement pattern of 100 sets of workpieces different from one another. Image processing including pattern matching is performed for each image. Information on a pick position and orientation and information on an outer shape of a workpiece in a two-dimensional image of the workpiece in each image are acquired. These 100 sets of training data are generated, deep learning using the MASK R-CNN is performed, and a trained model is generated.

As a robot system configured to convey an actual workpiece, a configuration similar to that of the robot system in FIG. 5 and FIG. 6 can be adopted. In this case, as the vision sensor 32, a measuring instrument capable of acquiring a two-dimensional image and three-dimensional point group data can be adopted. A stereo camera can be adopted as the vision sensor 32, which is a measuring instrument, for example.

In the work of conveying a workpiece, the inference unit 56 estimates the pick position and orientation of the workpiece in a two-dimensional image of the workpiece and the outer shape of the workpiece included in the image, based on a two-dimensional image imaged by the vision sensor 32. The vision sensor 32 outputs a two-dimensional image and outputs three-dimensional point group data.

The inference unit 56 acquires three-dimensional point group data from the vision sensor 32. The inference unit 56 acquires three-dimensional point group data acquired by the stereo camera, for example. The inference unit 56 calculates a two-dimensional pick position (position of a pixel in an image) and orientation in a two-dimensional image. Next, based on the relationship of calibration of the measuring instrument, the inference unit 56 calculates a three-dimensional pick position of a point on a three-dimensional space corresponding to the pick position (pixel position) in the two-dimensional image from the three-dimensional point group data. Regarding the orientation of a workpiece, when the training data 57 includes the pick orientation of the workpiece, the orientation of the workpiece estimated by the inference unit 56 can be adopted. As described above, the inference unit 56 can calculate the three-dimensional pick position and orientation of a workpiece from a two-dimensional image by using measurement data from the measuring instrument having a function of a two-dimensional measuring instrument and a function of a three-dimensional measuring instrument.

When the training data 57 does not include the pick orientation of a workpiece, the inference unit 56 may calculate the orientation of the workpiece in a three-dimensional space based on three-dimensional point group data. For example, the three-dimensional orientation of the workpiece can be calculated based on the two-dimensional orientation in a calculated two-dimensional image and the point group data around the three-dimensional pick position.

Next, based on the three-dimensional pick position of the workpiece 91 calculated from three-dimensional point group data and the orientation of the workpiece at the pick position, the operation control unit 43 calculates the three-dimensional positions and orientations of the robot and the hand when the robot picks out the workpiece. Then, the operation control unit 43 controls the positions and orientations of the robot 3 and the hand 4.

As described above, in the second training data generator, information on the position and orientation of a workpiece and information on the outer shape in a two-dimensional image can be acquired using the two-dimensional image. Then, as a vision sensor of a robot configured to actually perform a work, a measuring instrument capable of acquiring a two-dimensional image and three-dimensional point group data can be adopted. The second training data generator can generate excellent training data in which a deviation amount of the position of an actual workpiece in the real world with respect to the position of the workpiece in simulation is corrected.

In the above embodiment, pattern matching is performed for detection of the pick position of a workpiece, but the embodiment is not limited to this. The pick position and orientation and the outer shape of a workpiece in an image may be detected using an image recognition technique such as blob detection or cylinder detection, for example.

In addition, the measuring instrument adopted in actual conveyance work is not limited to a stereo camera, and any measuring instrument capable of acquiring a two-dimensional image and three-dimensional point group data can be adopted. A measuring instrument in which an arbitrary three-dimensional measuring instrument is attached to a two-dimensional camera, for example, can be adopted. A measuring instrument including one two-dimensional camera and a distance sensor, or a measuring instrument including one two-dimensional camera and a laser scanner can be adopted.

Alternatively, a configuration in which one two-dimensional camera is attached to a movable movement device may be adopted. It is possible to acquire an image equivalent to that of a stereo camera by imaging an image from predetermined two different positions or angles with respect to the same arrangement pattern of a workpiece with one camera. In addition, in the above embodiment, three-dimensional point group data is adopted, but the embodiment is not limited to this. A distance image may be adopted as three-dimensional information.

The above-described training data generator is configured so as to use a two-dimensional image as training data, but the embodiment is not limited to this, and may use three-dimensional point group data as training data. In other words, as a measuring instrument of the training data generator, a three-dimensional measuring instrument configured to acquire three-dimensional point group data may be arranged in place of a two-dimensional measuring instrument. For example, a stereo camera can be arranged in place of a two-dimensional camera.

Then, when acquiring three-dimensional point group data by the three-dimensional measuring instrument, the image processing unit can also generate a distance image from the three-dimensional point group data. It is possible to generate a distance image in which the density of pixels changes in response to, for example, the distance from an origin position of the three-dimensional measuring instrument or any reference position in the three-dimensional space to each workpiece or the background. Then, similar control to that of a two-dimensional image can be performed by adopting training data including a distance image.

Furthermore, information on the outer shape and information on the pick position and orientation of a workpiece together with the distance image acquired by the three-dimensional measuring instrument may be included in training data. By performing three-dimensional measurement of an arrangement region of a workpiece, the measuring instrument can acquire three-dimensional information as three-dimensional point group data. The training data generating unit may generate training data including three-dimensional pick position information of a workpiece. In this case, also in a robot system configured to infer a pick position and the like of a workpiece using a trained model generated by performing machine learning and convey the workpiece, a three-dimensional measuring instrument can be adopted as a measuring instrument configured to measure an image included in training data, three-dimensional point group data, and the like. Then, for example, the pick position and orientation and the outer shape of a workpiece can be estimated based on a distance image or the like generated by measuring the arrangement region of a newly arranged workpiece.

In addition, when a three-dimensional measuring instrument capable of acquiring three-dimensional information is adopted, three-dimensional point group data can be acquired together with a two-dimensional image. The image processing unit can perform matching processing between three-dimensional point group data and the arrangement pattern in three-dimensional simulation generated by the arrangement pattern generating unit.

Next, the image processing unit can convert the three-dimensional pick position and orientation (the position and orientation expressed in the coordinate system of the virtual vision sensor in simulation) of a workpiece and the outer shape of the workpiece in three-dimensional simulation into the three-dimensional pick position and orientation (the position and orientation expressed in the coordinate system of the three-dimensional measuring instrument) of a workpiece and the outer shape of the workpiece in the three-dimensional point group data. Then, the training data generating unit may generate training data including at least one selected from a group of three-dimensional point group data, the three-dimensional pick position and orientation of a workpiece in the three-dimensional point group data, and the outer shape of the workpiece. The machine learning apparatus may adopt this training data and perform machine learning.

In addition, the arithmetic processing device of the training data generator may include a display part configured to display generated training data. The display part can be formed of a display panel such as a liquid crystal display panel or a touchscreen. The display part displays training data in which a label (information such as the pick position and orientation of a workpiece and the outer shape of a workpiece) is automatically given to an image (including a distance image) or three-dimensional point group data. The worker can check whether or not there is a label erroneously given to an image or three-dimensional point group data. The worker may delete or correct a label judged to be incorrect by using an input device such as a keyboard, a mouse, and a stylus. Alternatively, the worker may newly add label information. As described above, by performing machine learning using training data corrected by the worker, it is possible to generate a highly robust trained model with few errors.

Other configurations, actions, and effects are similar to those of the first training data generator and the machine learning apparatus including the first training data generator, and therefore description thereof will not be repeated here.

(Third Training Data Generator)

A third training data generator of the present embodiment will be described. The above-described first training data generator 1 and the second training data generator perform control of changing the position and orientation of a workpiece imaged by the vision sensor or of increasing the number of workpieces. In the third training data generator, an arrangement pattern of a workpiece appearing inside the visual field of the vision sensor is changed using a plurality of conveyance carts.

First, a plurality of workpieces are arranged inside the visual field of the vision sensor. For example, a plurality of workpieces may be arranged inside the visual field of the vision sensor using a method performed by the first training data generator or the second training data generator. Next, control of changing an arrangement pattern is performed by moving at least one or more workpieces to the outside of the visual field of the vision sensor. The configuration of the third training data generator is similar to the configuration of the first training data generator (see FIG. 1 and FIG. 2). In addition, as the vision sensor 32, a two-dimensional camera capable of acquiring a two-dimensional image is adopted.

Figure 8:
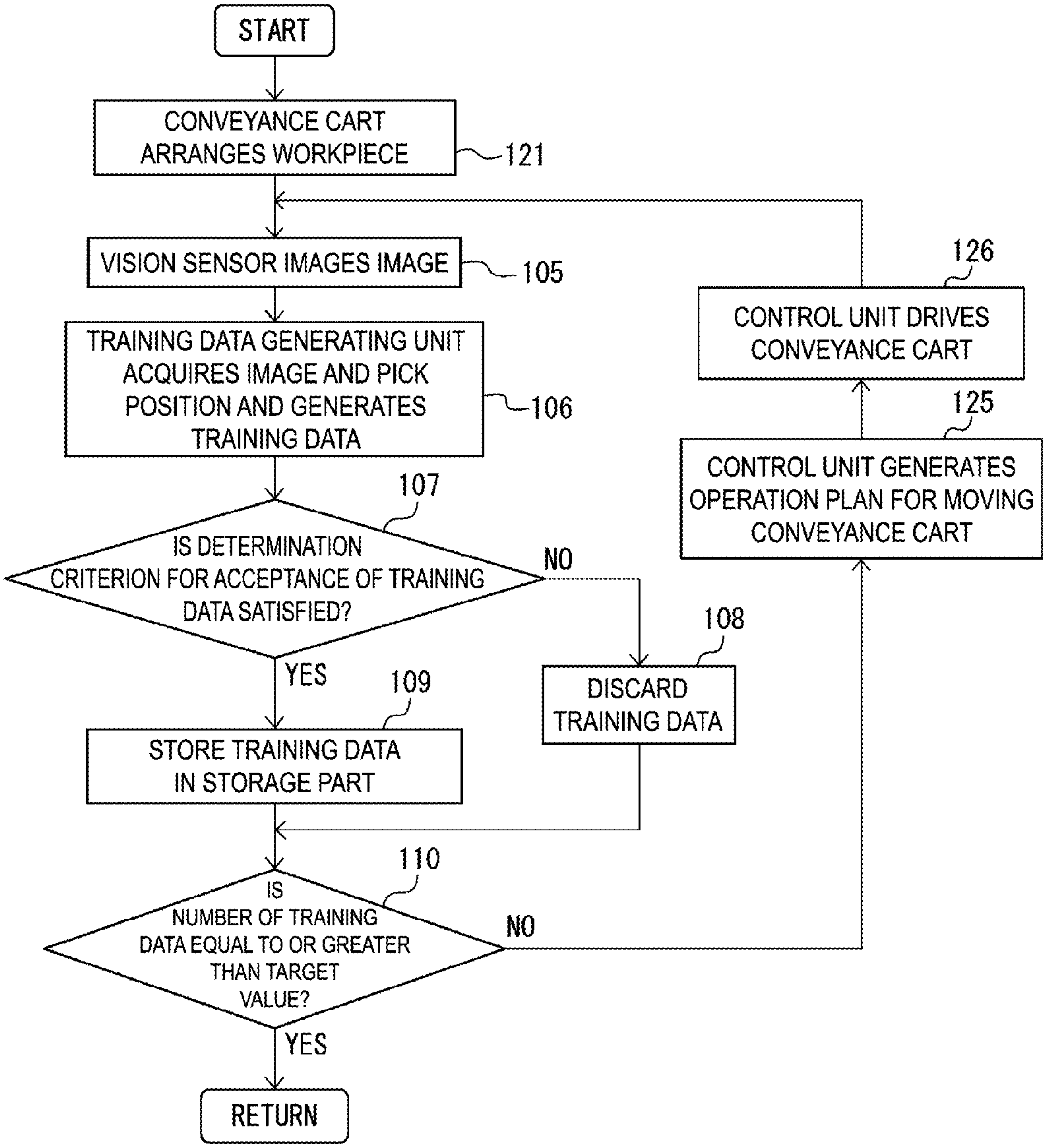
FIG. 8 is a flowchart of control of a third training data generator in the embodiment.

FIG. 8 shows a flowchart of control performed by the third training data generator. With reference to FIG. 1, FIG. 2, and FIG. 8, in step 121, the conveyance cart 31 arranges the plurality of workpieces 91 inside the visual field 32*a* of the vision sensor 32. For example, as illustrated in FIG. 1, many workpieces 91 are arranged within a range in which the vision sensor 32 images. This control can be performed by control similar to that of the first training data generator. For example, in the control of the first training data generator of FIG. 3, it can be performed by the control from step 101 to step 104. Alternatively, the worker may arrange the plurality of workpieces 91 inside the visual field 32*a* of the vision sensor 32 by manually conveying the conveyance cart 31.

Next, step 105 to step 110 are similar to step 105 to step 110 in the control of the first training data generator 1 (see FIG. 3). In step 110, when the number of training data is less than the target value, the control transitions to step 125.

In step 125, the operation plan generating unit 14*a* of the control unit 14 generates an operation plan for the conveyance cart 31 to be moved. In this case, an example of performing control of reducing the number of workpieces 91 one by one will be described. For example, the image processing unit 16 performs image processing on a two-dimensional image imaged in step 105 and detects a plurality of workpiece positions. Based on a processing result of the image processing unit 16, the operation plan generating unit 14*a* can generate an operation plan for the plurality of conveyance carts on which the plurality of workpieces present at the positions of the plurality of detected workpieces are placed. Alternatively, the conveyance cart 31 to be moved may be determined by the arrangement pattern generating unit 13*a* generating the arrangement pattern. The operation plan generating unit 14*a* can determine in advance the order of movement of the plurality of conveyance carts 31 to be moved. For example, the conveyance carts 31 can be moved in order from an end of the arrangement pattern.

The operation plan generating unit 14*a* may generate an operation plan for the conveyance cart 31 so that the conveyance cart 31 moves a workpiece arranged inside the visual field 32*a* to the outside. For example, the operation plan generating unit 14*a* can generate an operation plan so that the conveyance cart 31 on which the workpiece 91 is placed comes out of the visual field 32*a* of the vision sensor 32 and returns to a predetermined origin position or a start position.

Next, in step 126, the operation command generating unit 14*b* of the control unit 14 drives the conveyance cart 31 based on the operation plan generated in step 125. The operation command generating unit 14*b* can transmit a speed command of the conveyance cart 31 or a command of a movement route. After this, the control returns to step 105. Then, the control from step 105 to step 110 can be repeated.

As described above, the arrangement pattern can be changed by generating an arrangement pattern in which the number of workpieces is reduced one by one. The embodiment is not limited to the movement of one workpiece, and training data may be generated by performing imaging every time two or more workpieces are moved. As a result of reducing the number of workpieces existing inside the visual field 32*a* of the vision sensor 32, if there is no workpiece to be moved, the control shown in FIG. 8 can be repeated again.

When the plurality of conveyance carts 31 are movable, the operation plan generating unit 14*a* can generate an operation plan so that the conveyance carts 31 on which the workpieces 91 are placed come out of the visual field of the vision sensor one by one. Alternatively, the operation plan generating unit 14*a* may generate an operation plan for moving the plurality of conveyance carts 31 at a time. The imaging command generating unit 14*c* can transmit a command for imaging an image to the vision sensor 32 after the conveyance cart 31 comes out of the visual field 32*a* of the vision sensor 32 and returns to a predetermined position such as the origin position.

Other configurations, actions, and effects are similar to those of the first training data generator, the second training data generator, and the machine learning apparatus including the first training data generator, and therefore description thereof will not be repeated here.

(Fourth Training Data Generator)

Figure 9:
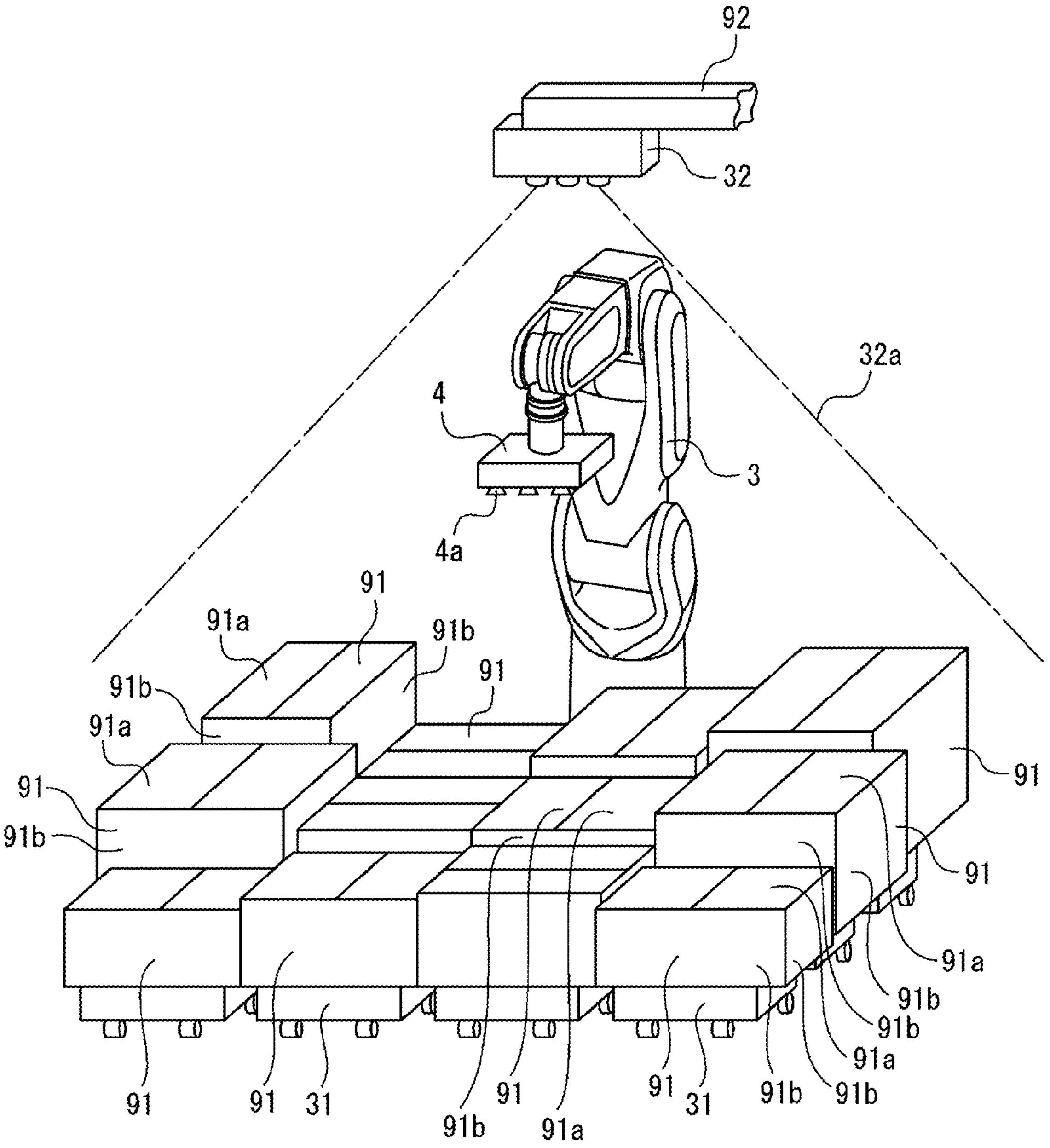
FIG. 9 is a perspective view of a fourth training data generator in the embodiment.
Figure 10:
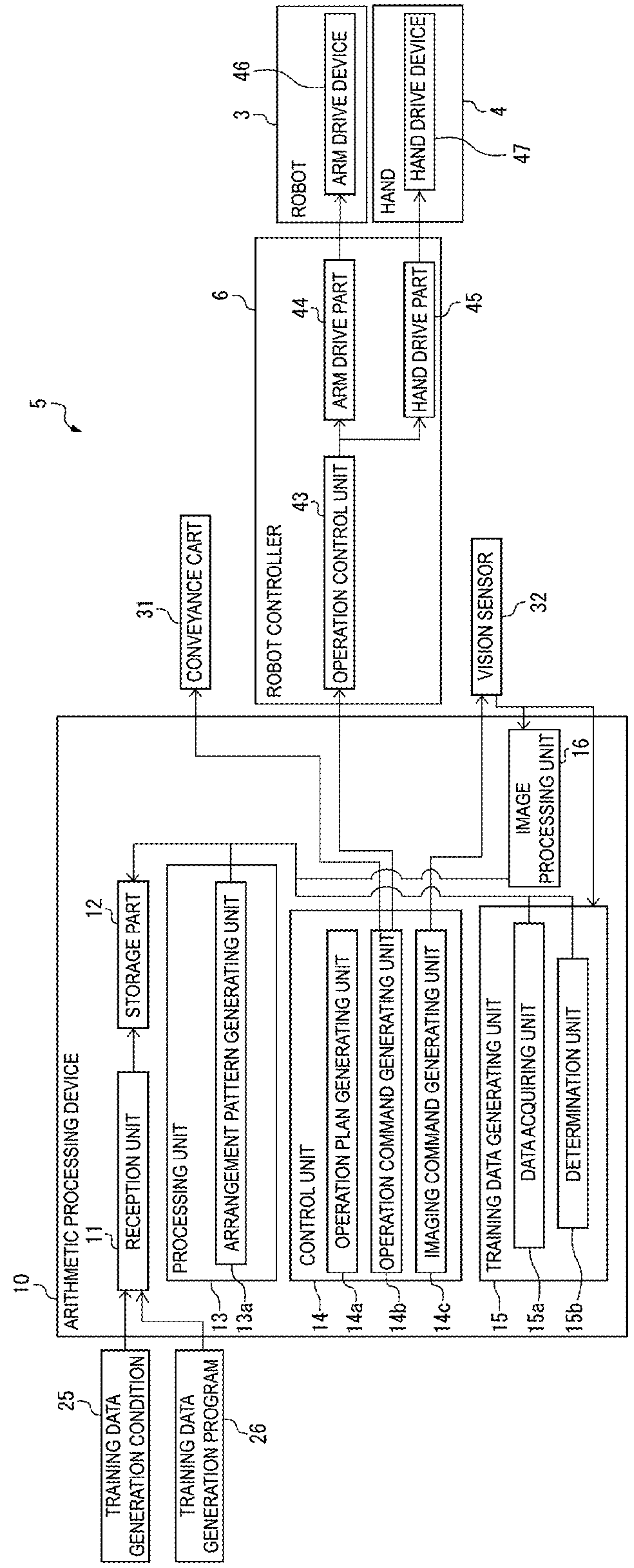
FIG. 10 is a block diagram of the fourth training data generator.

FIG. 9 is a perspective view of a fourth training data generator of the present embodiment. FIG. 10 is a block diagram of the fourth training data generator of the present embodiment. With reference to FIG. 9 and FIG. 10, in a fourth training data generator 5, an arrangement pattern of the plurality of workpieces 91 inside the visual field 32*a* of the vision sensor 32 is changed using a robot device including the robot 3 and the hand 4. As the vision sensor 32, a two-dimensional camera capable of acquiring a two-dimensional image is adopted.

The fourth training data generator 5 includes a robot device including the robot 3 and the hand 4 as a movement device configured to move a workpiece. The fourth training data generator 5 includes a robot controller 6. The configurations of the operation control unit 43, the arm drive part 44, and the hand drive part 45 of the robot controller 6 are similar to the configuration of the robot controller 2 of the robot system 8 configured to actually convey a workpiece (see FIG. 6). The configurations of the robot 3 and the hand 4 of the robot device are similar to the configuration of the robot system 8 configured to actually convey a workpiece. In addition, the configuration of the arithmetic processing device 10 is similar to the configuration of the arithmetic processing device 10 of the first training data generator 1 (see FIG. 2).

In the fourth training data generator 5, the robot device is used in order to move the workpiece 91 from the inside of the visual field 32*a* of the vision sensor 32 to the outside of the visual field 32*a*. In other words, the workpiece 91 is moved using the robot device in place of the conveyance cart 31 of the third training data generator.

Figure 11:
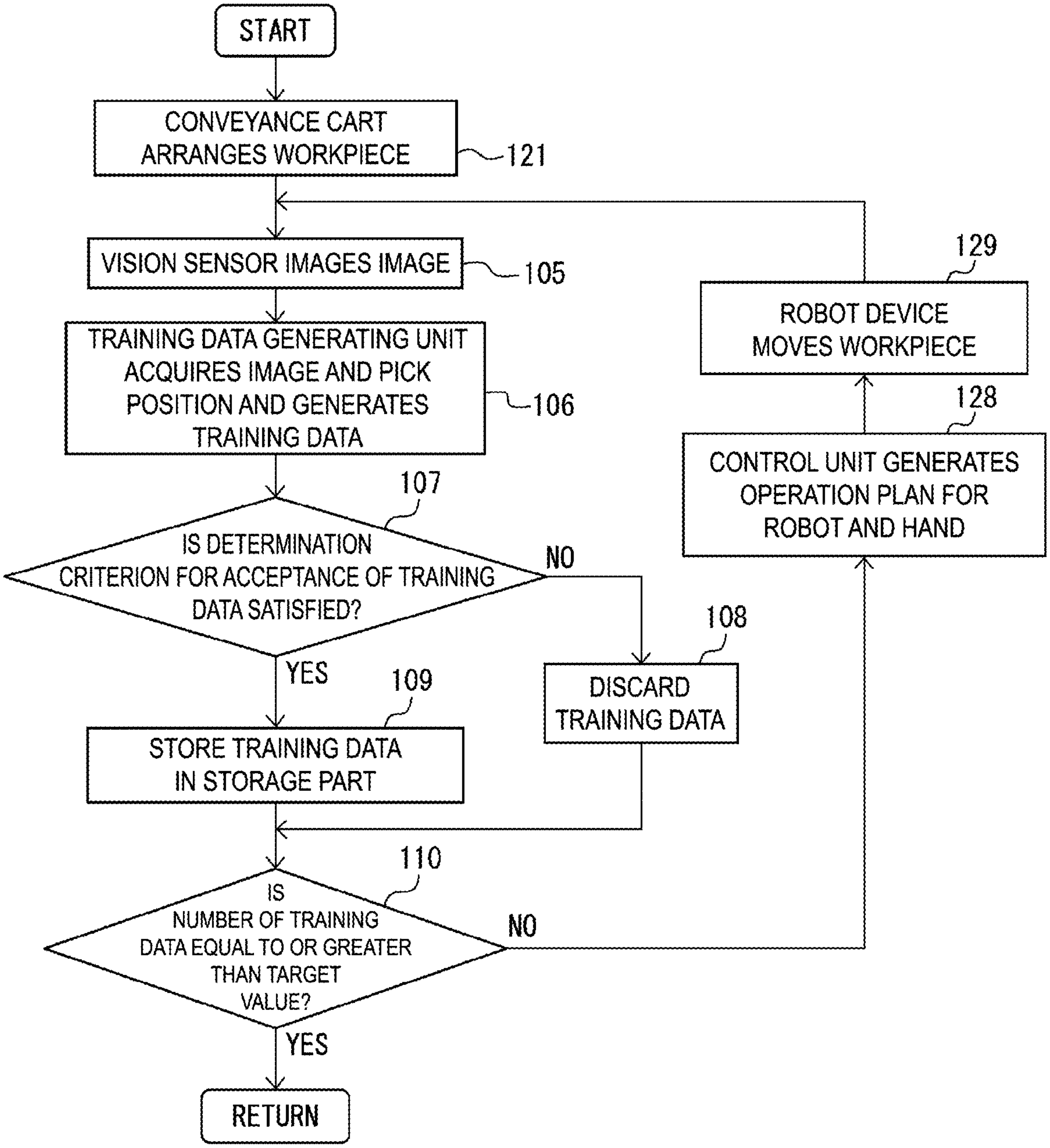
FIG. 11 is a flowchart of control of the fourth training data generator.

FIG. 11 is a flowchart showing control of the fourth training data generator. With reference to FIG. 9 to FIG. 11, step 121 and step 105 to step 110 are similar to those of the third training data generator (see FIG. 8). In step 110, when the number of training data is less than the target value, the control transitions to step 128.

In step 128, the operation plan generating unit 14*a* of the control unit 14 generates an operation plan for the robot device so as to move a plurality of workpieces present at positions of the plurality of workpieces detected as a processing result of image processing performed by the image processing unit 16 on the image imaged in step 105. In the control of selecting the workpiece that is thus moving, control similar to that in step 125 of the third training data generator can be performed (see FIG. 8). The operation plan generating unit 14*a* generates an operation plan for the robot device so as to move the workpiece 91 to a predetermined position, for example, on a conveyor.

In step 129, the operation command generating unit 14*b* generates an operation command for the robot device based on the operation plan for the robot device generated by the operation plan generating unit 14*a*. Next, the generated operation command for the robot device is transmitted to the operation control unit 43 of the robot controller 6. The operation command generating unit 14*b* transmits, to the operation control unit 43 of the robot controller 6, the positions and orientations of the robot and the hand for picking out a workpiece.

The operation control unit 43 drives the robot 3 and the hand 4 based on the above-described operation command. After a predetermined workpiece 91 is held by the hand 4, the workpiece 91 is arranged outside the visual field 32*a*. For example, the workpiece 91 can be conveyed to a temporary placement region or a temporary placement shelf arranged outside the visual field 32*a*. After this, the control returns to step 105. Then, the control from step 105 to step 110 is repeated until the number of training data reaches a target value. When the workpiece 91 to be moved is no longer present, the control of FIG. 11 can be repeated.

As described above, even when using the robot device as a movement device, the arrangement pattern of a workpiece can be changed by moving the workpiece arranged inside the visual field of the vision sensor to the outside of the visual field.

When the robot controller 6 fails in the operation of picking out the workpiece 91 by the robot device, the workpiece 91 may be moved outside the visual field 32*a* of the vision sensor 32 by moving the conveyance cart 31 on which a workpiece is placed. For example, the control unit 14 may perform control such that the conveyance cart 31 on which the workpiece is placed comes out of the visual field 32*a* of the vision sensor 32 and moves to the origin position. After the conveyance cart moves to the origin position, generation of training data including imaging of an image by the vision sensor can be resumed.

In addition, in the fourth training data generator, the arrangement pattern is changed by moving a workpiece so as to move from the inside to the outside of the visual field of the vision sensor. In other words, the robot device is controlled such that the number of workpieces existing inside the visual field of the vision sensor decreases, but the embodiment is not limited to this. The robot device may convey the workpiece such that the number of workpieces existing inside the visual field of the vision sensor increases.

Other configurations, actions, and effects are similar to those of the first training data generator to the third training data generator and the machine learning apparatus including the first training data generator, and therefore description thereof will not be repeated here.

In the third training data generator and the fourth training data generator, the arrangement pattern is changed by moving the workpiece conveyed by the conveyance cart from the inside to the outside of the visual field of the vision sensor, but the embodiment is not limited to this. The arrangement pattern may be changed by moving the workpiece conveyed by the conveyance cart from the outside to the inside of the visual field of the vision sensor. Alternatively, the position of the workpiece may be changed and the arrangement pattern may be changed by moving the workpiece conveyed by the conveyance cart while also moving the conveyance cart inside the visual field of the vision sensor. Alternatively, the arrangement pattern may be changed by the conveyance cart changing the orientation without changing the position of the workpiece inside the visual field of the vision sensor and changing the orientation of the workpiece placed on this conveyance cart.

The first training data generator to the fourth training data generator described above generate training data including a two-dimensional image imaged by the vision sensor mainly, but the embodiment is not limited to this. For example, when the training data generator includes a three-dimensional measuring instrument, a distance image may be generated from three-dimensional point group data measured by the three-dimensional measuring instrument, and training data including the distance image and label data such as the outer shape of a workpiece and the pick position and orientation of the workpiece may be generated. The machine learning apparatus may perform machine learning using such training data.

The first training data generator to the fourth training data generator described above generate training data including a two-dimensional image imaged by the vision sensor mainly, but the embodiment is not limited to this. For example, when the training data generator includes a three-dimensional measuring instrument, matching processing between three-dimensional point group data measured by the three-dimensional measuring instrument and a three-dimensional arrangement pattern generated by the arrangement pattern generating unit is performed. By using the result of the matching processing, the three-dimensional pick position and orientation and outer shape information in three-dimensional simulation of a plurality of workpieces calculated by the arrangement pattern generating unit are changed to the three-dimensional pick position and orientation and outer shape information in three-dimensional point group data measured in the real world. Training data including three-dimensional point group data may be generated using the changed pick position and orientation and outer shape information as label data of the three-dimensional point group data. The machine learning apparatus may perform machine learning using such training data.

The first training data generator to the fourth training data generator described above are configured so as to generate training data using, as label data, mainly information such as the pick position and orientation of a workpiece and the outer shape of the workpiece calculated by the arrangement pattern generating unit. Alternatively, the training data is configured to be generated using, as label data, information such as the pick position and orientation of a workpiece and the outer shape of the workpiece detected as a result of image processing of the image processing unit, but the embodiments are not limited to these forms. For example, an image imaged by the vision sensor, a distance image generated from three-dimensional point group data measured by the three-dimensional measuring instrument, or the three-dimensional point group data may be displayed on the display part such as a monitor, and the worker may teach, with an input device such as a mouse, information such as the pick position and orientation of a workpiece and the outer shape of the workpiece on the image or the three-dimensional point group data. In other words, the label data included in the training data may be teaching data generated by the worker.

Examples of applying the training data generator and the machine learning apparatus of the present embodiment include a system configured to convey corrugated cardboard containing a product as a workpiece in a warehouse of a distribution center. For example, corrugated cardboard containing a product delivered in an arrival process in the warehouse of the distribution center is placed on a conveyance cart such as an AGV, and an image is imaged by a two-dimensional camera while changing the arrangement pattern of a plurality of pieces of corrugated cardboard by controlling the operation of a plurality of AGVs. Training data including a plurality of imaged images, a pick position and orientation of the corrugated cardboard appearing in each of the images, and outer shape information of the corrugated cardboard can be generated by the above-described method. Machine learning is performed using the generated training data and a trained model is generated. The robot device may pick out corrugated cardboard present at a pick position and orientation inferred using a trained model with respect to an image of a plurality of pieces of corrugated cardboard stacked on a pallet delivered in an arrival process imaged by a two-dimensional camera, may place the corrugated cardboard onto a conveyor, and the corrugated cardboard may flow. After that, a postprocess such as unpacking, product checking, or sorting may be performed.

In each of the above-described controls, the order of steps can be changed appropriately to the extent that the function and action are not changed.

The above embodiments can be combined as appropriate. In each of the above-described drawings, the same or equivalent parts are denoted by the same sign. The above embodiments are examples and do not limit the invention. In addition, the embodiments include the modifications of the embodiments defined in the claims.

What is claimed:

1. A training data generator for generating training data for machine learning, the training data generator comprising:
- a vision sensor configured to
  - image an arrangement region of a plurality of workpieces, and
  - acquire at least one image selected from a group of a two-dimensional image and a three-dimensional image;
- a movement device configured to move at least one workpiece of the plurality of workpieces in a visual field of the vision sensor; and
- a processor configured to
  - control an operation of the movement device,
  - generate training data including the at least one image acquired by the vision sensor and pick position information for picking out the at least one workpiece, wherein
    - the training data is used for generating a trained model for estimating respective pick positions of the plurality of workpieces by machine learning, based on the at least one image, and
  - generate a plurality of training data by repeating control of moving the at least one workpiece by the movement device so as to change an arrangement pattern of the plurality of workpieces, imaging of the arrangement region of the plurality of workpieces by the vision sensor, and generation of the training data, wherein the arrangement region for generating the arrangement pattern of the plurality of workpieces in a stationary state is predetermined, the processor is configured to generate, within the arrangement region, a plurality of arrangement patterns of the plurality of workpieces, which is different from one another, based on a predetermined training data generation condition, the movement device is configured to move the plurality of workpieces within the arrangement region to change the arrangement pattern of the plurality of workpieces arranged in the arrangement region into one of the plurality of arrangement patterns generated by the processor, and the vision sensor is configured to acquire the at least one image of the plurality of workpieces in the stationary state arranged in the one of the plurality of arrangement patterns by the movement device.

2. The training data generator of claim 1, wherein the processor is configured to acquire the predetermined training data generation condition including at least one selected from a group of a target value of a number of training data, a range of a number of types of workpieces, a range of sizes of workpieces, and a condition of the arrangement pattern of workpieces.

3. The training data generator of claim 2, wherein the condition of the arrangement pattern of workpieces includes at least one selected from a group of a range of a number of layers on which workpieces are stacked and a condition of a gap between workpieces.

4. The training data generator of claim 1, wherein the processor is configured to generate an operation plan for the movement device using, as target values, the arrangement pattern including a position and orientation of the at least one workpiece, and generate an operation command for operating the movement device based on the generated operation plan, and the movement device is configured to, in response to a generated operation command, move the at least one workpiece.

5. The training data generator of claim 1, wherein the movement device is configured so as to perform an operation of changing a three-dimensional position and orientation of the at least one workpiece.

6. The training data generator of claim 1, wherein the vision sensor is configured to perform the three-dimensional image of the arrangement region, and acquire three-dimensional point group data, and the processor is configured to generate the training data including three-dimensional pick position information of the at least one workpiece.

7. The training data generator of claim 1, wherein the processor is configured to perform image processing on the at least one image acquired by the vision sensor, output, as a processing result, the pick position information for picking out the at least one workpiece by a robot device including a robot and a hand, and generate the training data including the outputted pick position information.

8. The training data generator of claim 4, wherein the processor is configured to perform image processing on the at least one image acquired by the vision sensor, and generate the operation plan based on a result of the image processing.

9. The training data generator of claim 1, wherein the processor is configured to determine acceptance of the training data based on whether or not a number of the training data has reached a predetermined target value.

10. The training data generator of claim 1, wherein the processor is configured to perform image processing on the at least one image acquired by the vision sensor, and determine whether to save or discard the training data based on a result of the image processing and a predetermined determination criterion for acceptance of the training data.

11. The training data generator of claim 1, wherein the movement device includes a conveyance cart configured to move on a floor surface with the at least one workpiece placed on the conveyance cart.

12. The training data generator of claim 1, wherein the movement device includes a robot device that includes a robot and a hand, and the robot device is configured to move the at least one workpiece while holding the at least one workpiece.

13. A machine learning apparatus, comprising:

a training data generator for generating training data for machine learning, the training data generator comprising:

a vision sensor configured to image an arrangement region of a plurality of workpieces, and acquire at least one image selected from a group of a two-dimensional image and a three-dimensional image;

a movement device configured to move at least one workpiece of the plurality of workpieces in a visual field of the vision sensor;

a processor configured to control an operation of the movement device, generate the training data including the at least one image acquired by the vision sensor and pick position information for picking out the at least one workpiece, and generate a plurality of the training data by repeating control of moving the at least one workpiece by the movement device so as to change an arrangement pattern of the plurality of workpieces, imaging of the arrangement region of the plurality of workpieces by the vision sensor, and generation of the training data; and a further processor configured to perform the machine learning based on the training data to generate a trained model for estimating respective pick positions of the plurality of workpieces, and estimate the pick position of the at least one workpiece from the at least one image acquired by the vision sensor based on the trained model, wherein the arrangement region for generating the arrangement pattern of the plurality of workpieces in a stationary state is predetermined, the processor is configured to generate, within the arrangement region, a plurality of arrangement patterns of the plurality of workpieces, which is different from one another, based on a predetermined training data generation condition, the movement device is configured to move the plurality of workpieces within the arrangement region to change the arrangement pattern of the plurality of workpieces arranged in the arrangement region into one of the plurality of arrangement patterns generated by the processor, and the vision sensor is configured to acquire the at least one image of the plurality of workpieces in the stationary state arranged in the one of the plurality of arrangement patterns by the movement device.

14. A method of generating training data used for machine learning, the method comprising:

imaging, by a vision sensor, an arrangement region of a plurality of workpieces;

acquiring, by the vision sensor, at least one image selected from a group of a two-dimensional image and a three-dimensional image;

moving, by a movement device, at least one workpiece of the plurality of workpieces in a visual field of the vision sensor;

changing, by the movement device, an arrangement pattern of the at least one workpiece; and generating the training data including the at least one image and pick position information for picking out the at least one workpiece, wherein the training data is used for generating a trained model for estimating respective pick positions of the plurality of workpieces by machine learning, based on the at least one image, and a plurality of training data is generated by repeating of the imaging of the arrangement region, the acquiring of the at least one image, the moving of the at least one workpiece, changing of the arrangement pattern, and the generating of the training data, the arrangement region for generating the arrangement pattern of the plurality of workpieces in a stationary state is predetermined, and the method further comprising:

generating, within the arrangement region, a plurality of arrangement patterns of the plurality of workpieces, which is different from one another, based on a predetermined training data generation condition, moving, by the movement device, the plurality of workpieces within the arrangement region to change the arrangement pattern of the plurality of workpieces arranged in the arrangement region into one of the plurality of arrangement patterns being generated, and acquiring, by the vision sensor, the at least one image of the plurality of workpieces in the stationary state arranged in the one of the plurality of arrangement patterns by the movement device.

15. A machine learning method, comprising:

the method of generating training data of claim 14;

performing the machine learning based on the training data;

generating the trained model for estimating a pick position of the at least one workpiece from the at least one image; and estimating the pick position of the at least one workpiece from the at least one image acquired by the vision sensor based on the trained model.

* * * * *